(12) United States Patent
Fukami

(10) Patent No.: US 8,419,373 B1
(45) Date of Patent: Apr. 16, 2013

(54) WIND TURBINE BLADE, WIND TURBINE GENERATOR EQUIPPED WITH WIND TURBINE BLADE AND METHOD OF DESIGNING WIND TURBINE BLADE

(75) Inventor: Koji Fukami, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/364,811

(22) Filed: Feb. 2, 2012

Related U.S. Application Data

(63) Continuation of application No. PCT/JP2011/073409, filed on Oct. 12, 2011.

(51) Int. Cl.
*F03D 1/02* (2006.01)

(52) U.S. Cl.
USPC .. 416/223 R; 416/228; 416/243; 416/DIG. 2; 416/DIG. 5; 416/223 A; 415/4.3; 415/4.5; 415/914

(58) Field of Classification Search ............... 416/223 R, 416/223 A, 228, 242, 243, DIG. 2, DIG. 5; 415/4.1, 4.3, 4.5, 914; 290/44, 55
See application file for complete search history.

(56) References Cited

U.S. PATENT DOCUMENTS

| 4,643,646 | A |   | 2/1987  | Hahn et al.     |         |
|-----------|---|---|---------|-----------------|---------|
| 4,773,825 | A | * | 9/1988  | Rodde et al.    | 416/223 R |
| 4,976,587 | A | * | 12/1990 | Johnston et al. | 416/230 |
| 5,474,425 | A | * | 12/1995 | Lawlor          | 416/223 R |
| 6,830,436 | B2 |  | 12/2004 | Shibata et al.  |         |
| 7,708,530 | B2 | * | 5/2010 | Wobben          | 416/243 |

(Continued)

FOREIGN PATENT DOCUMENTS

| EP | 1845258 | 10/2007 |
| EP | 2031242 | 3/2009 |

(Continued)

OTHER PUBLICATIONS

K. J. Standish et al., "Aerodynamic Analysis of Blunt Trailing Edge Airfoils", Journal of Solar Engineering, ASME, Nov. 2003, vol. 125, pp. 479-487.

(Continued)

*Primary Examiner* — Igor Kershteyn
(74) *Attorney, Agent, or Firm* — Manabu Kanesaka; Kenneth M. Berner; Benjamin J. Hauptman

(57) ABSTRACT

It is intended to provide a wind turbine blade with superior aerodynamic characteristics and rigidity, a wind turbine generator equipped with the wind turbine blade, and a method of designing the wind turbine blade. The wind turbine blade 1 is provided with a blade tip part 2, a blade root part 4 connected to a hub 112, and an airfoil part 6 disposed between the blade tip part 2 and the blade root part 4. The airfoil part 6 includes a flatback airfoil 10 with a blunt trailing edge 8 at least in an area in a longitudinal direction of the wind turbine blade 1 where a blade thickness ratio X is 40% to 50%. X indicates a ratio of a maximum thickness $t_{MAX}$ to a chord length $L_C$. In the area where the blade thickness ratio X is 40% to 50%, the flatback airfoil has a trailing edge thickness ratio Y which is 5% to $Y_H$%, Y indicating a ratio of a trailing edge thickness $t_{TE}$ to the maximum thickness $t_{MAX}$ and $Y_H$ has a relationship of $Y_H = 1.5X - 30$ with the blade thickness ratio X.

12 Claims, 9 Drawing Sheets

U.S. PATENT DOCUMENTS

| | | | |
|---|---|---|---|
| 7,883,324 B2 * | 2/2011 | Standish et al. | 416/242 |
| 7,946,803 B2 | 5/2011 | Wobben | |
| 2003/0175121 A1 | 9/2003 | Shibata et al. | |
| 2007/0036657 A1 | 2/2007 | Wobben | |
| 2009/0263252 A1 | 10/2009 | Slot | |
| 2010/0143146 A1 | 6/2010 | Bell et al. | |

FOREIGN PATENT DOCUMENTS

| | | |
|---|---|---|
| EP | 2063106 | 5/2009 |
| JP | H06-066244 | 3/1994 |
| JP | 2007009926 | 1/2007 |

OTHER PUBLICATIONS

Dale E. Berg et al., "Aerodynamic and Aeroacoustic Properties of Flatback Airfoils", American Institute of Aeronautics and Astronautics.

Dale E. Berg et al., PowerPoint presentation of "Aerodynamic and Aeroacoustic Properties of Flatback Airfoils".

K. J. Standish et al., "Aerodynamic Analysis of Blunt Trailing Edge Airfoils", Journal of Solar Energy Engineering, Nov. 2003, vol. 125, pp. 479-487.

J. P. Baker et al., "Experimental Analysis of Thick Blunt Trailing-Edge Wind Turbine Airfoils".

Dale E. Berg et al., "Aerodynamic and Aeroacoustic Properties of a Flatback Airfoil (Will it Rumble or Whisper?)", Presented at WINDPOWER 2008, Jun. 2-4, 2008, Houston, TX.

Joshua Paquette et al., PowerPoint presentation of "Increased Strength in Wind Turbine Blades through Innovative Structural Design", EWEC 2007, Milan, Italy.

C. P. van Dam et al., "Thick Airfoils with Blunt Trailing Edge for Wind Turbine Blades", Proceedings of ASME Turbo Expo 2010: Power for Land, Sea and Air, GT2010, Jun. 14-18, 2010, Glasgow, UK, GT2010-23786.

C. P. (Case) van Dam, "Research on Thick Blunt Trailing Edge Wind Turbine Airfoils", 2008 Wind Turbine Blade Workshop, Sandia National Laboratories, May 12-14, 2008.

David D. Chao et al., "CFD Analysis of Rotating Two-Bladed Flatback Wind Turbine Rotor", Sandia Report, SAND2008-1688, Printed Apr. 2008.

C. P. "Case" van Dam et al., "Trailing Edge Modifications for Flatback Airfoils", Sandia Report, SAND2008-1781, Printed Mar. 2008.

C. P. "Case" van Dam et al., "Computational Design and Analysis of Flatback Airfoil Wind Tunnel Experiment", Sandia Report, SAND2008-1782, Printed Mar. 2008.

Jonathon P. Baker et al., "Flatback Airfoil Wind Tunnel Experiment", Sandia Report, SAND2008-2008. Printed Apr. 2008.

Matthew F. Barone et al., "Aerodynamic and Aeroacoustic Tests of a Flatback Version of the DU97-W-300 Airfoil", Sandia Report, SAND2009-4185, Printed Aug. 2009.

Jonathon P. Baker et al., "Drag Reduction of Blunt Trailing-Edge Airfoils", BBAA VI International Colloquinm on: Bluff Bodies Aerodynamics & Applications, Milano, Italy, Jul. 20-24, 2008.

Matthew Barone et al., PowerPoint presentation of "Aeroacoustics and Aerodynamic Performance of a Rotor with Flatback Airfoils", 2010 European Wind Energy Conference, Warsaw, Poland, Apr. 23, 2010.

* cited by examiner

FIG. 14A  FIG. 14B  FIG. 14C
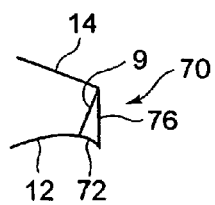 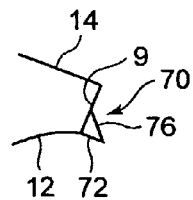 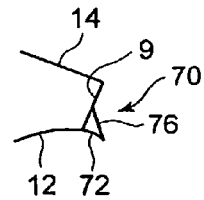
FIG. 15
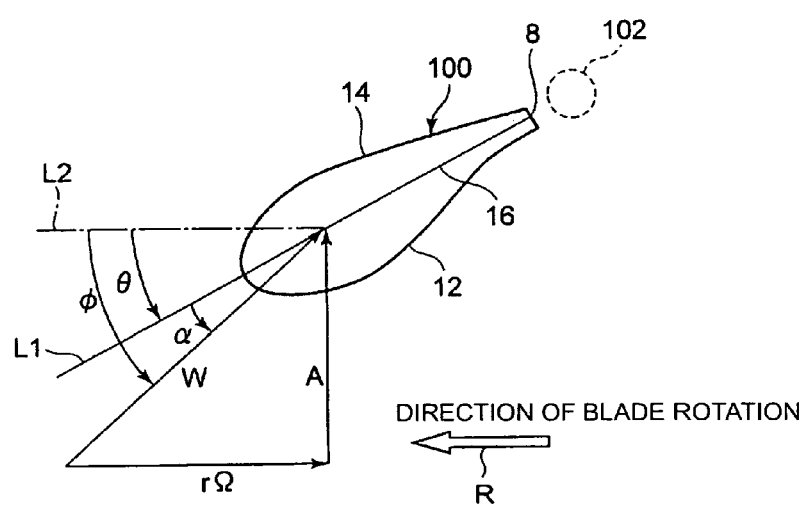

WIND TURBINE BLADE, WIND TURBINE GENERATOR EQUIPPED WITH WIND TURBINE BLADE AND METHOD OF DESIGNING WIND TURBINE BLADE

TECHNICAL FIELD

The present invention relates to a wind turbine blade, a wind turbine generator with the wind turbine blade and a method of designing the wind turbine blade.

BACKGROUND ART

In recent years, from a perspective of preserving the environment, it is becoming popular to use a wind turbine generator which generates power from wind power. In a wind turbine generator, a kinetic energy in the wind is converted into a rotation energy of a blade (i.e. a rotor as a whole including the blade) and the rotation energy is converted into electric power in a generator.

Electricity generated by the wind turbine generator (wind turbine output) is expressed by Formula 1 below. The wind turbine output is improved with higher blade efficiency and a greater blade diameter.

$$\text{Wind turbine output} = \tfrac{1}{2} * \text{air density} * (\text{wind speed})^3 * \text{blade efficiency} * \text{conversion efficiency} * \pi * (\text{blade diameter}/2)^2 \quad \text{(Formula 1)}$$

The blade efficiency, herein, refers to an efficiency of converting the kinetic energy in the wind to the rotation energy of the blade (i.e. a rotor as a whole including the blade). The conversion efficiency refers to an efficiency of transmitting the rotation energy of the rotor to the generator and generating power in the generator.

It is know that blade efficiency has a maximum theoretical efficiency (Betz's limit=0.593). Specifically, even at the maximum theoretical efficiency, only 59.3% of the kinetic energy in wind can be converted to the rotation energy of the blade (precisely, the rotor as a whole, including the blades). In an actual wind turbine blade, the blade efficiency that can be achieved is up to approximately 0.5 due to influence of swirl of a wake and presence of air resistance.

Presently, the blade efficiency of the wind turbine blade developed for practical use is typically around 0.49. This leaves merely about 0.01 in the blade efficiency (2% of the entire blade efficiency of the existing blade) to improve by improving the blade design. However, the blade design improvement may lead to increased noise and efficiency decline due to off-design condition and thus may be undesirable.

Therefore, it is difficult to significantly increase the power generated by the wind turbine generator by improving the blade efficiency.

Meanwhile, the power generation output is affected as the square of the blade diameter. Thus, it is effective to increase the blade diameter so as to enhance the power generation output. However, the increased blade diameter leads to an increase in load acting on the wind turbine blade from the wind (aerodynamic load) and an increase in load (weight load) in response to increased weight of the wind turbine blade, which may result in a larger nacelle to support the rotor and in increased cost.

In view of this, it is possible with a modified design of an airfoil (a cross-sectional shape of the wind turbine blade) to reduce the load on the blade from the wind (aerodynamic load) by making the chord of the wind turbine blade shorter and also to suppress the increase in the load (weight load) in response to the increased weight of the wind turbine blade.

There are flatback airfoils with thicker trailing edge in a portion closer to a hub side of the wind turbine blade (e.g. Patent Literatures 1 through 5 and Non-Patent Literature 1).

Specifically, Patent Literature 1 describes a wind turbine blade having a plurality of flatback airfoils defined by coordinates. Patent Literature 2 proposes a flatback airfoil of a divergent type whose blade thickness around the trailing edge increases as closer with shorter distance to the trailing edge. A technique of producing a wind turbine blade having a flatback airfoil using a flatback airfoil insert is disclosed in Patent Literature 3. Patent Literature 4 discloses a wind turbine blade of a flatback airfoil type having a splitter plate attached to a trailing edge to reduce noise. Patent Literature 5 proposes to additionally attach a blade element to a wind turbine blade having a sharp trailing edge so that the airfoil profile is changed to a flatback airfoil profile by increasing a thickness of the trailing edge. Further, in Non-Patent Literature 1, evaluation results of aerodynamic characteristics of a flatback airfoil using several calculations are shown.

FIG. 15 shows a wind turbine having a flatback airfoil. The wind turbine blade 100 has a thickness in the trailing edge 8, which generates wake in a area 102 downstream of the trailing edge 8. A negative pressure in the area 102 downstream of the trailing edge 8 draws the flow of the air flowing along a suction-side surface 14 and delays separation of a boundary layer from the suction-side surface 14. More specifically, the negative pressure generated in the area 102 downstream of the trailing edge 8 draws the flow of the air toward the suction-side surface 14, thereby suppressing the separation of the boundary layer and moving a separation point of the boundary layer on the suction-side surface 14 toward the downstream side to a vicinity of the trailing edge 8 (fixing the separation point of the boundary layer to the vicinity of the trailing edge 8). Thus, in comparison to a conventional airfoil with a sharp trailing edge, this airfoil creates lift to a high angle of attack. Therefore, it is possible to obtain enough lift in spite of a shorter chord length. By reducing the chord length, the aerodynamic load acting on the wind turbine blade from the wind can be reduced.

The flatback airfoil has a blunt trailing edge and thus, section modulus of the flatback airfoil is superior to that of the conventional airfoil with a sharp trailing edge. Thus, it is possible to reduce the weight of the blade while maintaining its strength.

Although not related to a flatback airfoil, Patent Literature 6 discloses a wind turbine blade provided with an additional portion on a pressure-side near a trailing edge in a transition portion between an airfoil portion and a blade root portion to increase lift.

CITATION LIST

Patent Literature

[Patent Literature 1] U.S. Pat. No. 7,883,324 B
[Patent Literature 2] US 2009/0263252 A
[Patent Literature 3] US 2010/0143146 A
[Patent Literature 4] EP 2063106 A
[Patent Literature 5] EP 2031242 A

[Patent Literature 6] EP 1845258 A

Non-Patent Literature

[Non-Patent Literature 1] "Aerodynamic Analysis of Blunt Trailing Edge Airfoils" by K. J. Standish et al, from Journal of Solar Energy Engineering published in November 2003, vol. 125, pp. 479-487

SUMMARY OF INVENTION

Technical Problem

In a general wind turbine blade, in a high wind speed range above a wind speed that achieves a rated rotation speed, an increase in angle of attack in response to an increased wind speed is greater as it is closer to the blade root in a longitudinal direction of the blade and also the angle of attack tends to increase. This is explained in reference to a speed vector diagram of FIG. 15.

In FIG. 15, the wind turbine blade rotates in a direction of an arrow R. The wind turbine blade 100 is arranged such that the chord 16 is set with an angle θ with respect to the blade rotation direction R. The angle θ is an angle between a line L1 extending from the chord 16 and a straight line L2 parallel to the rotation direction R and indicates an attachment angle (a pitch angle) of the wind turbine blade 100. A relative wind speed vector W is a speed vector of the wind relative to the wind turbine blade 100 rotating in the blade rotation direction R. The relative wind speed vector W is a vector sum formed by combining a wind speed vector A blowing in a direction perpendicular to the rotation direction of the wind turbine 100 and a circumferential speed vector rQ of the wind turbine blade 100. And an angle a formed between the relative speed vector W and the line L1 extending from the chord 16 is the angle of attack of the wind turbine blade 100.

In the high wind speed range above the wind speed that achieves the rated rotation speed, the wind turbine blade 100 is kept at the rated rotations peed and thus, the circumferential speed vector rQ is constant. Thus, the wind speed increases and the wind speed vector A becomes greater. Correspondingly, the angle of attack a of the wind turbine blade 100 increases. The amount of increase in the angle of attack a is greater as it gets closer to the blade root with a small circumferential vector rQ in the longitudinal direction of the blade. Specifically, the closer it is to the blade root side with the small circumferential vector rQ in the longitudinal direction of the blade, the amount of increase in the angle of attack a becomes greater in response to increased wind speed and the angle of attack a tends to increase.

Therefore, in the area near the blade root part, it is desirable to form the trailing edge with thickness (by adopting the flatback airfoil) and to maintain the lift to the high angle of attack. With blunt trailing edge, a drag increases as well as the lift. In the area near the blade root part, the advantage of increased lift outweighs the disadvantage of the increased drag and thus, the technical advantage of making the trailing edge thicker prevails. Specifically, a high lift-drag ratio can be achieved. In contrast, as it gets closer to the blade tip part, the disadvantage of the increased drag by adopting the flatback airfoil outweighs the advantage of the increased lift. In some cases, the lift-drag ratio even decreases by making the trailing edge thicker.

Through researches by the inventors, it was learned that, in an area which is comparatively closer to the blade root part and in which a blade thickness ratio X of a maximum blade thickness relative to the chord length is in a range of 40% to 50%, the technical advantage of forming the trailing edge with thickness outweighs the disadvantage. Therefore, in the above area, it is important to set the thickness of the trailing edge of the flatback airfoil within an appropriate range so as to improve the aerodynamic characteristics and rigidity.

However, there is not enough knowledge regarding the flatback airfoil or regarding an ideal thickness of the trailing edge of the flatback airfoil in the above-described area.

In Patent Literatures 1 through 6 and Non-Patent Literature 1, there is no detailed description about what range the thickness of the trailing edge of the flatback airfoil should be set within the range where the blade thickness ratio is in the range of 40% to 50%.

In view of the above issues, it is an object of the present invention is to provide a wind turbine blade with superior aerodynamic characteristics and rigidity, a wind turbine generator equipped with the wind turbine blade, and a method of designing the wind turbine blade.

Solution to Problem

A wind turbine blade of the present invention may include, but is not limited to:

a blade tip part;

a blade root part which is connected to a hub of a wind turbine; and an airfoil part which is disposed between the blade tip part and the blade root part and which includes a flatback airfoil with a blunt trailing edge at least in an area in a longitudinal direction of the wind turbine blade where a blade thickness ratio X is not less than 40% and not greater than 50%, X indicating a ratio of a maximum thickness $t_{MAX}$ to a chord length $L_C$, and in the area where the blade thickness ratio X is not less than 40% and not greater than 50%, the flatback airfoil may have a trailing edge thickness ratio Y which is not less than 5% and not greater than $Y_H$%, Y indicating a ratio of a trailing edge thickness $t_{TE}$ to the maximum thickness $t_{MAX}$, and $Y_H$ may have a relationship of $Y_H = 1.5X - 30$ with the blade thickness ratio X.

According to the knowledge of the inventors of the present invention, in the area which is comparatively close to the blade root side where the blade thickness ratio X is not less than 40% and not greater than 50%, the flatback airfoil is formed with a blunt trailing edge, hence effectively improving the characteristics of lift-drag ratio. Therefore, in the above wind turbine blade, in the area where the blade thickness ratio X is 40 to 50% in the longitudinal direction of the blade, the flatback airfoil is formed with a blunt trailing edge.

Further, in the area where the blade thickness ratio X is 40 to 50%, the trailing edge thickness ratio Y is set to not less than 5% and thus, it is possible to effectively delay separation of the boundary layer from the suction-side surface by negative pressure generated due to the wake behind the trailing edge. More specifically, the negative pressure generated on a downstream side of the trailing edge draws the flow of the air toward the suction-side surface, thereby effectively suppressing the separation of the boundary layer from the suction-side surface. Therefore, it is possible to generate lift up to a high angle of attack. In other words, the high lift characteristics of not losing speed until the high angle of attack is reached can be achieved. Further, by setting the trailing edge thickness ratio to not less than 5%, section modulus of the wind turbine blade is improved, thereby attaining a lighter wind turbine blade while maintaining the strength of the wind turbine blade.

However, the blunt trailing edge causes increase of the drag as well as the lift. And the thicker the trailing edge is, the higher a lift-drag ratio (=lift/drag) becomes, which does not necessary improve the aerodynamic characteristics. According to the result of the study made by the inventors, in such a case that the trailing edge thickness ratio Y is set higher than the upper limit $Y_H$ (=1.5X−30), the increase in the lift is inferior to the increase in the drag and thus, there is not sufficient improvement effect of the lift-drag ratio in almost entire range of the angle of attack. On that point, in the above turbine blade, the trailing edge thickness ratio Y is set not greater than the upper limit $Y_H$ (=1.5X−30) in the area where the blade thickness ratio X is 40 to 50%. Thus, it is possible to have sufficient improvement effect of the lift-drag ratio in at least some range of the angle of attack.

In the above wind turbine blade, in such a case that a relationship T≦−5S+5 is satisfied where S is a parameter expressed by S=$L_{CMAX}$/R, $L_{CMAX}$ being a maximum chord length, R being a rotation radius of the wind turbine blade and T is a parameter expressed by T=RQ*Lr/R, RQ being a circumferential speed of the blade tip part, Lr being a representative chord length, the trailing edge thickness ratio Y of the flatback airfoil may have a relationship of X−20≦Y≦1.5X−30 in the a where the blade thickness ratio X is not less than 40% and not greater than 50%, in such a case that a relationship T≧−5S+6 is satisfied, the trailing edge thickness ratio Y of the flatback airfoil may be expressed by 5≦Y≦0.5X−5 in the area where the blade thickness ratio X is not less than 40% and not greater than 50%, and in such a case that a relationship −5S+5<T<−5S+6 is satisfied, the trailing edge thickness ratio Y of the flatback airfoil may be expressed by 0.5X−5≦Y≦X−20 in the area where the blade thickness ratio X is not less than 40% and not greater than 50%.

The representative chord length may be a chord length at a blade radius position r where a ratio of the chord length to the rotation radius R is 0.8.

The technical definitions of the parameter S and T are explained in reference to FIG. 16A to FIG. 16D.

In a general wind turbine, once the wind speed reaches a cut-in wind speed $V_1$ or above, the wind turbine is operated at approximately constant circumferential speed ratio at which performance (efficiency) is optimum (maximum) (see FIG. 16B). The circumferential speed ratio is also referred to as an optimum circumferential speed ratio or a design circumferential speed ratio. The circumferential speed ratio is a ratio of a blade tip speed [rpm] relative to an upstream wind speed [m/s]. A wind speed on an infinite upstream side (the upstream wind speed) is used, which is not affected by the presence of the wind turbine blade. In a variable speed range between the cut-in wind speed $V_1$ and a wind speed $V_2$ at which the rated rotation speed is reached, a relative speed vector W changes in response to the change of the wind speed vector A so as to maintain the circumferential speed ratio at the optimum circumferential speed ratio (a design circumferential speed ratio), and the angle of attack a is maintained approximately at a constant value (=an optimum angle of attack $a_{opt}$) which is optimal for the wind turbine blade (see FIG. 16B and FIG. 16D).

In contrast, once the wind speed reaches the wind speed $V_2$ at which the rated rotation speed is reached, the rotation speed is maintained at a constant value (a rated rotation speed) and thus, a circumferential speed vector rQ is maintained approximately at a constant magnitude. Thus, in a high wind speed range between the wind speed $V_2$ at which the rated rotation speed is reached and a wind speed $V_3$ at which a rated power is reached, when the wind speed increases, the wind speed vector A alone increases, resulting in increased attack of angle a (see FIG. 16D). The increase of the angle of attack a continues till the wind speed $V_3$ (the rated wind speed) at which the wind turbine output reaches the rated power. Once the rated wind speed $V_3$ is reached, the angle of attack a is reduced using pitch control of the wind turbine blade, thereby maintaining constant wind turbine output. Further, conditions may slightly vary between $V_2$ and $V_3$. from those shown in FIG. 16 due to the pitch control.

In the high wind speed range between the wind speed $V_2$ at which the rated rotation speed is reached and the wind speed $V_3$ at which the rated power is reached, the amount of increase in the angle of attack a with respect to the increase in the upstream wind speed is expressed as a slope in FIG. 16D and is affected by the chord length. If the wind turbine blade has zero chord length, the magnitude of the wind speed vector A increases for the amount of increase in the upstream wind speed and the angle of attack a of the wind turbine blade increases in response to the amount of increase in the magnitude of the speed vector A. However, the chord length of the actual wind turbine blade is not zero and thus, the magnitude of the wind speed A toward the wind turbine blade is affected, in no small part, by the presence of the wind turbine blade and thus the magnitude of the wind speed vector A increases below the amount corresponding to the increase of the infinite upstream wind speed (the upstream wind speed). Further, with the larger chord length of the wind turbine, the presence of the wind turbine blade inevitably has influence. Thus, the amount of increase in the magnitude of the wind speed vector when the infinite upstream wind speed (the upstream wind speed) decreases, is smaller. Accordingly, the increase in the angle of attack a with respect to the increase in the upstream wind speed is smaller as the chord length of the wind turbine blade increases. The increase in the angle of attack a with respect to the increase in the upstream wind speed is a sensitivity of the angle of attack a with respect to the change of the wind speed, more specifically the slope of the graph in FIG. 16D. The parameter S is a ratio of the rotation radius R of the wind turbine blade to the maximum chord length $L_{CMAX}$. The parameter S is a dimensionless number indicating a dimension of the size of the chord length of the wind turbine blade. Thus, the greater the parameter S is, the smaller the sensitivity of the angle of attack a with respect to the wind speed is. More specifically, the parameter S is indicative of sensitivity of the angle of attack a to the change of the wind speed (an amount of increase in the angle of attack a to an amount of increase in the wind speed on an infinite upstream side).

As seen in FIG. 16D, the greater the wind speed difference (=$V_3$−$V_2$) between the wind speed $V_2$ and the wind speed $V_3$ (the rated wind speed), the greater the maximum angle of attack, $a_{MAX}$ within the operation range of the wind turbine is. This increases the likelihood of the angle of attack exceeding a stall angle (particularly at a position on the blade root side in the longitudinal direction of the blade). Therefore, it is important to design the wind turbine blade so as not to stall up to a high angle of attack.

Herein, the rated wind speed $V_3$ is around 10 m/s in most wind turbines (normally 11 to 12 m/S). And the maximum angle of attack, $a_{MAX}$ that is available within the operation range of the wind turbine is mainly influenced by the wind speed $V_2$ at which the rated rotation speed is reached. More specifically, the smaller the wind speed $V_2$ at which the rated rotation speed is reached, the greater the wind speed difference, $V_3$−$V_2$ is. For the corresponding amount, the amount of increase in the angle of attack from the optimum angle of attack increases and the maximum angle of attack, $a_{MAX}$ increases.

The wind speed $V_2$ can be given by the blade tip speed/the design circumferential speed ratio. The design circumferential speed ratio has a strong correlation with a chord length distribution of the wind turbine blade and as a fact of aerodynamics, the design circumferential speed ratio has substantially an inverse relationship with the chord length/the rotation radius R. Further, the chord length is distributed at different values in the longitudinal direction of the wind turbine blade but is often represented by a representative chord length (=a chord length at a blade radius position r where a ratio of the chord length to the rotation radius R is 0.8) which has the most influence on performance of the wind turbine blade. More specifically, as a relationship of 1/design circumferential speed ratio∝blade tip representative chord length/rotation radius R is established, a parameter T expressed by T=RQ*Lr/R is indicative of the wind speed $V_2$ at which the rated rotation speed is reached. In T=RQ*Lr/R, RQ is a circumferential speed of the blade tip part, Lr is a representative Chord length and R is the rotation radius (T=blade tip circumferential speed*blade tip representative chord length/rotation speed radius Roc blade tip circumferential speed/design circumferential speed, i.e. T∝wind speed $V_2$ is substantially established).

Then, the rated wind speed $V_3$ takes similar values in most wind turbines and thus, the parameter T which is indicative of the wind speed $V_2$ at which the rated rotation speed is reached, expresses the wind speed difference $V_3-V_2$. As a result, the parameter indicates the maximum angle of attack, $a_{MAX}$ within the operation range of the wind turbine. More specifically, in such a case that the parameter T is great and the wind speed $V_2$ is high, the wind speed difference $V_3-V_2$ is small and for the corresponding amount, the amount of increase in the angle of attack from the optimum angle of attack, $a_{opt}$ decreases, and hence the maximum angle of attack, $a_{MAX}$, resulting in comparatively low maximum angle of attack, $a_{MAX}$. In contrast, in such a case that the parameter T is small and the wind speed $V_2$ is low, the wind speed difference $V_3-V_2$ is great and for the corresponding amount, the amount of increase in the angle of attack from the optimum angle of attack, $a_{opt}$ increases, and hence the maximum angle of attack, $a_{MAX}$, resulting in comparatively high maximum angle of attack, $a_{MAX}$.

Therefore, in such a case that the parameters S and T satisfy the relationship of $T \leq -5S+5$, the parameter S is small for the same parameter T in comparison to the case of $T \geq -5S+6$. More specifically, the sensitivity of the angle of attack a to the change of the wind speed is high. The parameter T expresses the difference between the wind speed at which the rated rotation speed is reached and the rated wind speed. Therefore, the angle of attack a increases significantly during increasing of the wind speed from the wind speed at which the rated rotation speed is reached to the rated wind speed. Moreover, in the case where the parameters S and T satisfy the relationship of $T \leq -5S+5$, for the same parameter S, the parameter T is small in comparison to the case of $T \geq -5S+6$. In other words, the difference of the wind speed, $V_3-V_2$, is large. Therefore, the angle of attack a increases significantly during increasing of the wind speed from the wind speed at which the rated rotation speed is reached to the rated wind speed. More specifically, in the case where the parameters S and T satisfy the relationship of $T \leq -5S+5$, within the operation range of the wind turbine from reaching the rated rotation speed to the rated power, the angle of attack a increases to a comparatively high value. In such case, therefore, it is effective to set the trailing edge thickness ratio Y to $X-20 \leq Y \leq 1.5X-30$ in the area where the blade thickness ratio X is 40% to 50% so as to suppress the separation of the boundary layer on the suction-side surface to the high angle of attack a.

In contrast, in such a case that the parameters S and T satisfy the relationship of $T \geq -5S+5$, the parameter S is large for the same parameter T (the difference between the wind speed at which the rated rotation speed is reached and the rated wind speed) in comparison to the case of $T \leq -5S+6$. More specifically, the sensitivity of the angle of attack a to the change of the wind speed is low. Therefore, the angle of attack a increases slightly during increasing of the wind speed from the wind speed at which the rated rotation speed is reached to the rated wind speed. Moreover, in the case where the parameters S and T satisfy the relationship of $T \geq -5S+5$, for the same parameter S, the parameter T is great in comparison to the case of $T \leq -5S+6$. In other words, the difference of the wind speed, $V_3-V_2$, is small. Therefore, the angle of attack a increases slightly during increasing of the wind speed from the wind speed at which the rated rotation speed is reached to the rated wind speed. More specifically, in the case where the parameters S and T satisfy the relationship of $T \geq -5S+5$, within the operation range of the wind turbine from reaching the rated rotation speed to the rated power, the angle of attack a increases slightly. In such case, therefore, it is effective to set the trailing edge thickness ratio Y to $5 \leq Y \leq 0.5X-5$ in the area where the blade thickness ratio X is 40% to 50% so as to minimize the trailing edge thickness and suppress increasing of the drag, thereby increasing the lift.

In such a case that the parameters S and T satisfy the relationship of $-5S+6<T<-5S+5$, in the area where the blade thickness ratio X is $40\% \leq X \leq 50\%$, the trailing edge thickness ratio Y is set to $0.5X-5 \leq Y \leq X-20$ to maintain the trailing edge thickness ratio within the appropriate range. By this, the increase of the drag can be suppressed to a certain extent while suppressing the separation of the boundary layer to a certain angle of attack a.

In the above wind turbine blade, in an area where the blade thickness ratio X is not less than 35% and not greater than 40%, the blade thickness ratio X and the trailing edge thickness ratio Y may have a relationship of $X-35 \leq Y \leq 4X-130$.

In this manner, by setting the trailing edge thickness ratio Y to not less than $X-35$, it is possible to effectively delay separation of the boundary layer from the suction-side surface by the negative pressure generated due to the wake downstream of the trailing edge, thereby generating the lift to the high angle of attack. Further, by setting the trailing edge thickness ratio Y to not less than $X-35$, section modulus of the wind turbine blade is improved, thereby attaining a lighter wind turbine blade while maintaining the strength of the wind turbine blade.

Meanwhile, by setting the trailing edge thickness ratio Y to not greater than $4X-130$, it is possible to attain sufficient effect of improving the lift-drag ratio at least in some area of the angle of attack.

In the above wind turbine blade, the flatback airfoil may have a cross-sectional shape with the blunt trailing edge formed by expanding a distance between a pressure-side surface and a suction-side surface of a standard airfoil with a sharp trailing edge, the airfoil part may include a pressure-side extension surface which is one of a concavely-curved surface and a flat surface that extend in a continuous manner behind the trailing edge of the flatback airfoil from the pressure-side surface of the flatback airfoil, and the pressure-side extension surface may incline with respect to a chord of the flatback airfoil such as to separate from the chord toward a downstream side.

In this manner, by providing the concavely-curved or flat pressure-side extension surface which extends continuously behind the trailing edge of the flatback airfoil from the pressure-side surface of the flatback airfoil. This deflects the flow of the air (wind) on the pressure side of the flatback airfoil downward (in a direction away from the pressure-side surface) and the lift acting on the wind turbine blade 1 increases.

In such a case that the pressure-side extension surface is provided, the airfoil part may include a suction-side extension surface which extends behind the trailing edge of the flatback airfoil from the suction-side surface of the flatback airfoil, the pressure-side extension surface and the suction-side extension surface may be respectively an outer surface on a pressure-side and an outer surface on a suction side of an extension portion which extends behind the trailing edge of the flatback airfoil, and an angle between a back end surface of the extension portion and the suction-side extension surface may be smaller than an angle between the suction-side surface and an end surface of the trailing edge of the flatback airfoil.

By this, the angle between the back end surface and the suction-side extension surface of the extension portion becomes closer to an acute angle. Therefore, the negative pressure downstream of the extension portion draws the flow of the air flowing along the suction-side surface more strongly toward the suction-side surface and thus the separation of the boundary layer from the suction-side surface can be further delayed.

Further, by attaching to the flatback airfoil the extension portion as the separate member formed separately from the flatback airfoil, it is possible to improve the rigidity of the trailing edge of the flatback airfoil, a buckling strength of the wind turbine blade and a strength of adhesive bonding of the pressure-side outer shell and the suction-side outer shell that constitute the wind turbine blade.

Alternatively, in the case where the pressure-side extension surface is provided, the pressure-side extension surface may be an outer surface on a pressure-side of an extension portion which extends behind the trailing edge of the flatback airfoil, an outer surface of the extension portion on the suction side may intersect with an end surface of the trailing edge of the flatback airfoil at a position closer to the pressure side than an intersection point where the suction-side surface of the flatback airfoil intersects with the trailing edge of the flatback airfoil, and the intersection point between the suction-side surface and the trailing edge of the flatback airfoil may be not covered by the extension portion.

In this manner, by not covering the intersection point between the suction-side surface and the trailing edge of the flatback airfoil by the extension portion, it is possible to attain an effect of improved lift by the pressure-side extension surface without an adverse effect on the suppression effect of the separation of the boundary layer.

In the above wind turbine blade, the flatback airfoil may have a cross-sectional shape with a blunt trailing edge formed by expanding a distance between a pressure-side surface and a suction-side surface of a standard airfoil with a sharp trailing edge, the airfoil part may be provided with a covering member which covers the trailing edge of the flatback airfoil and parts of the pressure-side and the suction-side of the flatback airfoil that are on the trailing-edge side, and an outer surface of the covering member on the pressure side may be one of a concavely-curved surface and a flat surface that extend in a continuous manner from the pressure-side surface of the flatback airfoil, said outer surface of the covering member inclining with respect to a chord of the flatback airfoil such as to separate from the chord toward a downstream side.

In this manner, by forming the outer surface of the covering member on the pressure side as the concavely-curved or flat pressure-side extension surface which extends continuously from the pressure-side surface of the flatback airfoil, the flow of the air (wind) on the pressure side of the flatback airfoil is deflected downward (in a direction away from the pressure-side surface) and the lift acting on the wind turbine blade increases.

Further, by covering the trailing edge side of the flatback airfoil by the covering member, it is possible to improve the rigidity of the trailing edge and a buckling strength of the wind turbine blade.

In the above wind turbine blade, the airfoil part may be twisted in a longitudinal direction of the wind turbine blade, and an end surface of the trailing edge of the flatback airfoil may be a flat or curved surface not twisted in the longitudinal direction by varying an angle θ between the end surface of the trailing edge of the flatback airfoil and a plane orthogonal to the chord of the flatback airfoil in relation to the longitudinal direction of the wind turbine blade.

By this, the end surface of the trailing edge of the flatback airfoil, i.e. the trailing edge surface is formed into a flat or curved surface which is not twisted and this makes it easy to produce the wind turbine blade.

In the above wind turbine blade, the angle θ may increase with a distance from the blade tip part.

In a general wind turbine blade, the closer it is to the blade root part in the longitudinal direction of the blade, the greater the amount of increase in angle of attack in response to an increased wind speed and the greater the angle of attack tends to be. In view of this, by increasing the angle θ with a distance from the blade tip part, the angle between the suction-side surface and the trailing edge surface becomes closer to a sharp angle. Thus, the closer to the blade root part, the higher the angle of attack can be to generate more lift (higher lift characteristics can be achieved to a high angle of attack without losing speed).

In the above wind turbine blade, the flatback airfoil may be open at the trailing edge such that a pressure-side outer shell forming a pressure-side surface of the flatback airfoil and a suction-side outer shell forming a suction-side surface of the flatback airfoil do not contact with each other at the trailing edge, and the pressure-side outer shell and the suction-side outer shell may be joined together by a trailing-edge spar which extends in a longitudinal direction of the wind turbine blade between the pressure-side outer shell and the suction-side outer shell at a position nearer to the trailing edge.

By joining the pressure-side outer shell and the suction-side outer shell via the trailing-edge spar, it is possible to achieve sufficient strength although the pressure-side outer shell and the suction-side outer shell are not closed at the trailing edge. Further, the flatback airfoil is open at the trailing edge but the open trailing edge does not significantly affect the flow of the wind on the pressure side and the suction side. Furthermore, by leaving the trailing edge open, the trailing edge spar is exposed to outside and this is favorable for checking an attachment state of the trailing edge spar.

Advantageous Effects of Invention

According to the present invention, in the area which is comparatively close to the blade root side where the blade thickness ratio X is not less than 40% and not greater than 50%, the flatback airfoil is formed with a blunt trailing edge, hence effectively improving the characteristics of lift-drag ratio.

Further, in the area where the blade thickness ratio X is 40 to 50%, the trailing edge thickness ratio Y is set to 5% or higher and thus, it is possible to effectively delay separation of the boundary layer from the suction-side surface by negative pressure generated due to the wake behind the trailing edge. More specifically, the negative pressure generated on a downstream side of the trailing edge draws the flow of the air toward the suction-side surface, thereby effectively suppressing the separation of the boundary layer from the suction-side surface. Therefore, it is possible to generate the lift up to a high angle of attack. Further, by setting the trailing edge thickness ratio Y to 5% or above, section modulus of the wind turbine blade is improved, thereby attaining a lighter wind turbine blade while maintaining the strength of the wind turbine blade.

Furthermore, the trailing edge thickness ratio Y is set not greater than the upper limit $Y_H(=1.5X-30)$ in the area where the blade thickness ratio X is 40 to 50%. Thus, it is possible to have sufficient improvement effect of the lift-drag ratio in at least some range of the angle of attack.

BRIEF DESCRIPTION OF DRAWINGS

FIG. 14 shows another example of the wind turbine blade regarding the fourth embodiment.

FIG. 15 shows the wind turbine blade having a flatback airfoil.

FIG. 16A is a graph showing a relationship between an upstream wind speed and a rotation speed. FIG. 16B is a graph showing a relationship between the upstream wind speed and a circumferential speed ratio. FIG. 16C is a graph showing a relationship between the upstream wind speed and a wind turbine output. FIG. 16D is a graph showing a relationship between the upstream wind speed and an angle of attack.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

While the present invention is described with reference to exemplary embodiments, it is obvious to those skilled in the art that various changes may be made without departing from the scope of the invention.

First Embodiment

First, a wind turbine blade regarding a first embodiment is explained.

Figure 1:
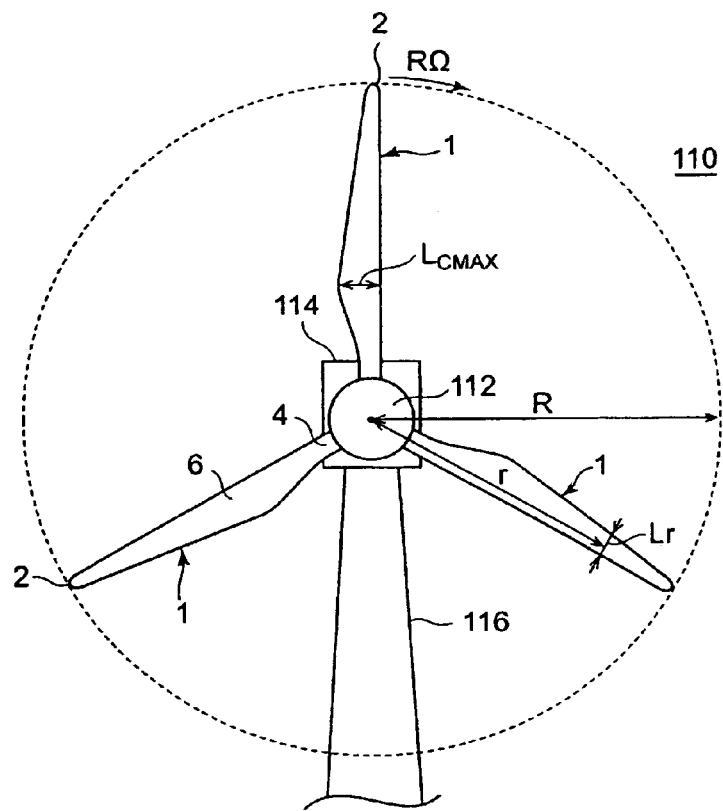
FIG. 1 shows an exemplary structure of a wind turbine generator.
Figure 2:
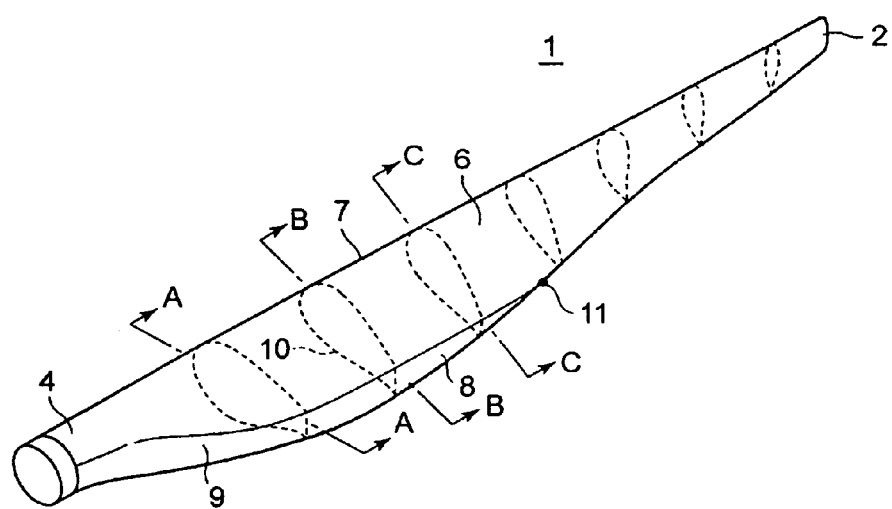
FIG. 2 is an oblique perspective view of a wind turbine blade regarding a first embodiment.

FIG. 1 shows an exemplary structure of a wind turbine generator. FIG. 2 is an oblique perspective view of the wind turbine blade regarding the first embodiment.

As shown in FIG. 1, the wind turbine generator 110 is provided with at least one wind turbine blade 1 (three blades in this example), a hub 112 where the blade 1 is attached, a nacelle 114 supporting a rotor including the wind turbine blade 1 and the hub 112, and a tower 116 supporting the nacelle 114 rotatably. The rotation of the rotor is inputted to a generator not shown and the generator generates power.

The wind turbine blade 1 is attached to the hub 112 by fixing a blade root part 4 of the wind turbine blade 1 to the hub 112 using any fixing member.

As shown in FIG. 2, the wind turbine blade 1 includes a blade tip part 2, the blade root part 4 coupled to the hub 112 of the wind turbine (see FIG. 1), and an airfoil part 6 disposed between the blade tip part 2 and the blade root part 4. The airfoil part 6 includes a leading edge 7. The airfoil part 6 is at least partially formed with a blunt trailing edge. In other words, the airfoil part 6 at least partially includes a flatback airfoil 10 with the blunt trailing edge 8.

Figure 3A:
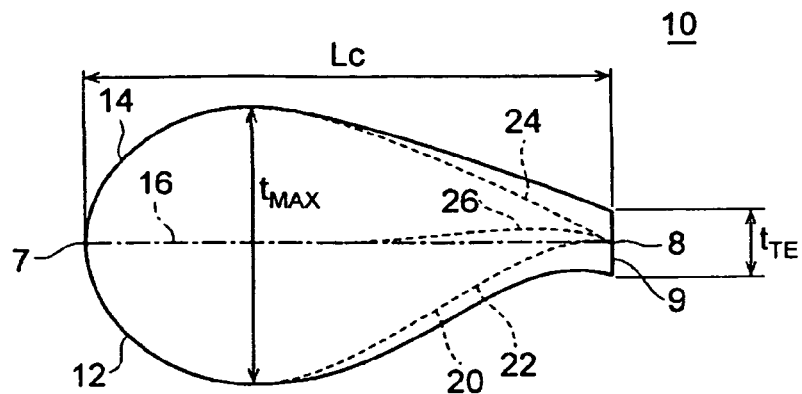
FIG. 3 shows an example of a flatback airfoil.
Figure 3B:
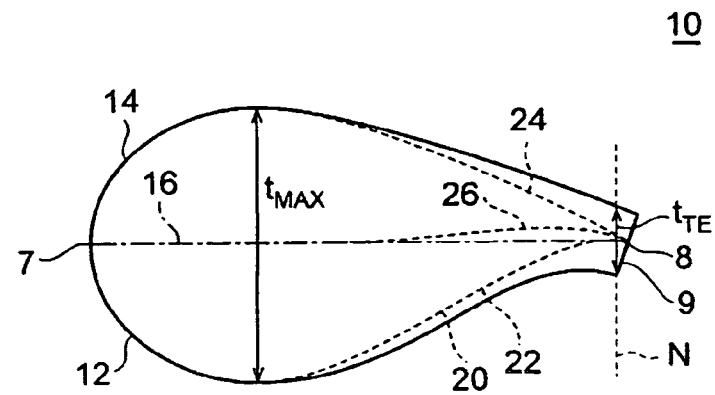

The flatback airfoil 10 of the airfoil part 6 is explained. FIG. 3A and FIG. 3B show examples of the flatback airfoil 10.

As shown in FIG. 3A and FIG. 3B, the flatback airfoil 10 is shaped by a pressure-side surface 12 and a suction-side surface 14. FIG. 3A and FIG. 3B show a trailing edge thickness $t_{TE}$ of the trailing edge 8 of the flatback airfoil 10, a chord length $L_C$ of a chord 16 between the leading edge 7 and the trailing edge 8 and a orthogonal plane N which is orthogonal to the chord 16. The chord 16 is created by connecting middle points in a thickness direction of the trailing edge surface 9.

As shown in FIG. 3B, in such a case that a trailing edge surface 9 inclines with respect to the chord 16, the trailing edge thickness $t_{TE}$ is a thickness in the orthogonal plane N which intersects with the pressure-side surface 12 and the suction-side surface 14 at the most downstream.

In the examples shown in FIG. 3A and FIG. 3B, the thickness of the flatback airfoil 10, i.e. a distance between the pressure-side surface 12 and the suction-side surface 14, gradually increases from zero starting from the leading edge 7 toward the trailing edge 8 until the thickness of the flatback airfoil 10 reaches the maximum thickness $t_{MAX}$. Once the thickness of the flatback airfoil 10 reaches the maximum thickness $t_{MAX}$, it gradually decreases to the trailing edge thickness $t_{TE}$.

The flatback airfoil 10 preferably has a cross-sectional shape with the blunt trailing edge formed by expanding a distance between the pressure side surface 22 and the suction-side surface 24 of a standard airfoil 20 with a sharp trailing edge. More specifically, different from a truncated airfoil formed by chopping off the sharp trailing edge of the standard airfoil 20, the flatback airfoil 10 is preferably formed by opening the sharp trailing edge of the standard airfoil 20.

For instance, as shown in FIG. 3A, the pressure-side surface 22 and the suction-side surface 24 of the standard airfoil 20 are displaced outward by the same amount from a camber line 26 as a centerline so as to obtain the pressure-side surface 12 and the suction-side surface 14 of the flatback airfoil 10. The camber line 26 is formed by connecting midpoints between the pressure-side surface 22 and the suction-side surface 24 of the standard airfoil 20. The camber line is an important factor that affects aerodynamic characteristics of the airfoil. In this manner, by displacing positions of the pressure-side surface 22 and the suction-side surface 24 of the standard airfoil 20 outward by the same amount from the camber line 26, the flatback airfoil 10 with a blunt trailing edge can be obtained while maintaining the camber line 26, which affects the aerodynamic characteristics.

As the standard airfoil 20, an airfoil for an aircraft, such as a NACA airfoil or an airfoil specifically for a wind turbine, such as a DU airfoil and MEL airfoil maybe used.

In such a case that the wind turbine blade 1 is twisted in the longitudinal direction of the blade as shown in FIG. 2, an end surface 9 of the trailing edge 8 may be a flat or curved surface which is not twisted in the longitudinal direction by varying an angle θ between the end surface 9 of the trailing edge 8 and the orthogonal plane which is orthogonal to the chord 16 in relation to the longitudinal direction of the wind turbine blade.

Figure 4A:
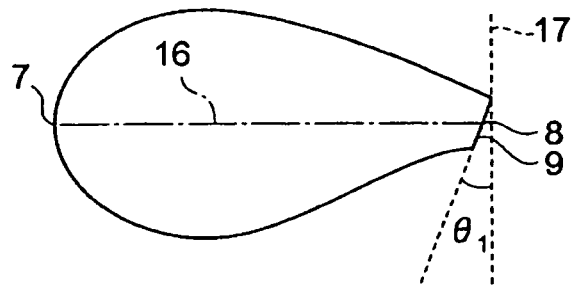
FIG. 4A is a cross-sectional view taken along a line A-A of FIG. 2.
Figure 4B:
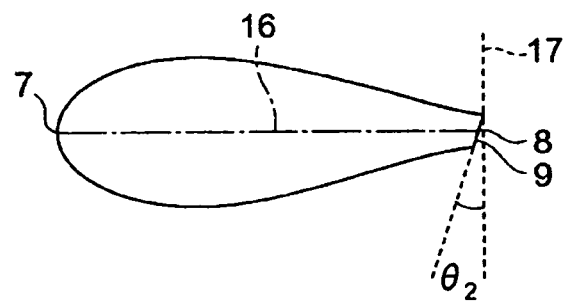
FIG. 4B is a cross-sectional view taken along a line B-B of FIG. 2.
Figure 4C:
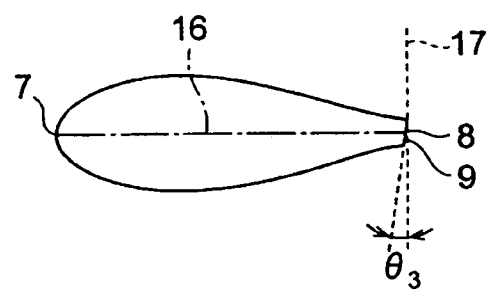
FIG. 4C is a cross-sectional view taken along a line C-C of FIG. 2.

FIG. 4A to FIG. 4C show cross-sectional views along A-A line, B-B line and C-C line of FIG. 2 respectively. As shown in FIG. 4 to FIG. 4C, an angle θ between a back end surface 9 of the flatback airfoil 10 and the orthogonal plane 17 increases toward the blade root part 4 ($\theta_1 > \theta_2 > \theta_3$). In this manner, by varying the angle θ between the back end surface 9 and the orthogonal plane 17 in the longitudinal direction of the wind turbine blade, the back end surface 9 of the trailing edge 8 of the flatback airfoil can be formed into a flat or curved surface not twisted. Thus, the wind turbine blade 1 can be produced easily. In the example shown in FIG. 2, the back end surface 9 is a curved surface which curves in the longitudinal direction of the blade.

Further, by increasing the angle θ with a distance from the blade tip part, the angle between the suction-side surface 14 and the trailing edge surface 9 becomes closer to a sharp angle. Thus, the closer to the blade root part 4, the higher the angle of attack can be to generate more lift (higher lift characteristics can be achieved to a high angle of attack without losing speed).

The angle θ between the end surface 9 of the trailing edge 8 and the orthogonal plane 17, is zero at a starting point (a flatback starting point 11 in FIG. 2) where the flatback airfoil 10 is applied and then gradually increases from the flatback starting point 11 toward the blade root part 4 so that the end surface 9 of the trailing edge 8 is a flat or curved surface. The blade root part normally has a cylindrical shape.

In the first embodiment, the shape of the flatback airfoil 10 is determined by a relationship between a blade thickness ratio X and a trailing edge thickness ratio Y. X indicates a ratio of a maximum thickness $t_{MAX}$ to a chord length $L_C$, $X = t_{MAX}/L_C$. Y indicates a ratio of a trailing edge thickness $t_{TE}$ to the maximum thickness $t_{MAX}$, $Y = t_{TE}/t_{MAX}$.

Figure 5:
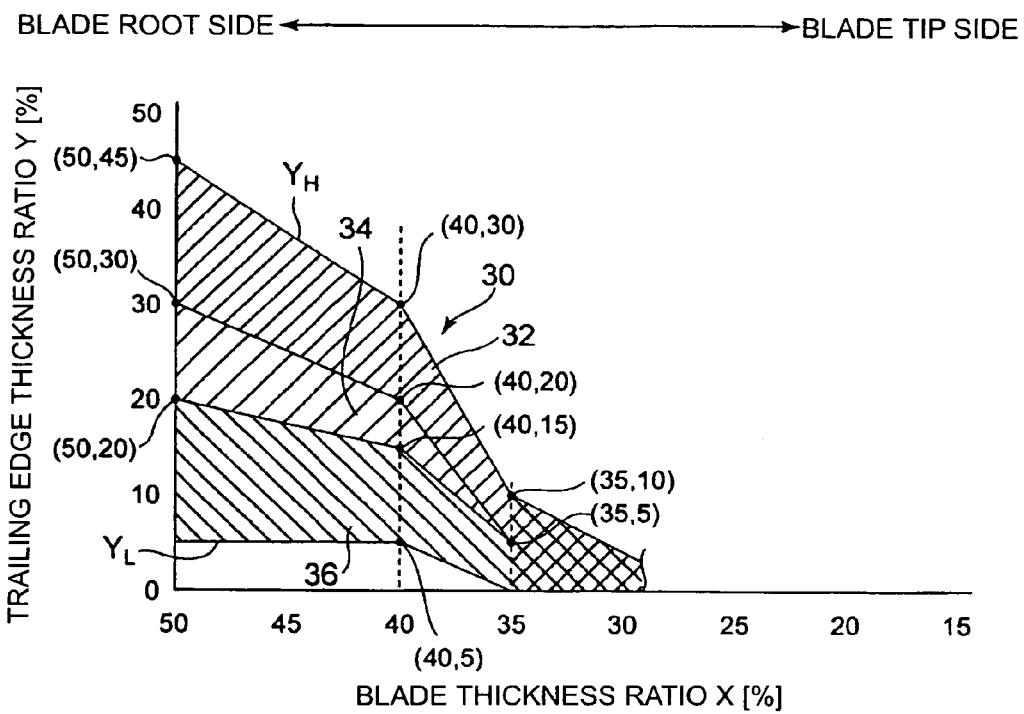
FIG. 5 is a graph showing setting areas used to determine a shape of a flatback airfoil.

FIG. 5 is a graph showing setting areas used to determine a shape of the flatback airfoil. In the first embodiment, the shape of the flatback airfoil 10 is determined so that the trailing edge thickness ratio Y is within an allowable area 30 between a lower limit $Y_L$ and an upper limit $Y_H$ at a certain blade thickness ratio X.

It is know that, in a general wind turbine blade, the blade thickness ratio X decreases from the blade root part 4 toward the blade tip part 2. In FIG. 5, the blade thickness ratio X decreases from the left side toward the right side of the graph and thus, the left side of the graph is the blade root side and the right side of the graph is the blade tip side.

In an area which is comparatively close to the blade root side where the blade thickness ratio X is not less than 40% and not greater than 50%, the lower limit $Y_L$ of the allowable area is 5% and the upper limit $Y_H$ of the allowable area 30 is $Y_H = 1.5X - 30$. More specifically, in such a case that the blade thickness ratio X is not less than 40% and not greater than 50%, the shape of the flatback airfoil 10 is determined so that the blade thickness ratio X and the trailing edge thickness ratio Y satisfy a relationship of $5\% \leq Y \leq 1.5X - 30$.

By setting the trailing edge thickness ratio to 5% or above in the range where the blade thickness ratio X is $40\% \leq X \leq 50\%$, it is possible to effectively delay separation of a boundary layer from the suction-side surface 14 by negative pressure generated due to the wake behind the trailing edge 8. More specifically, the negative pressure generated on a downstream side of the trailing edge 8 draws the flow of the air toward the suction-side surface 14, thereby effectively suppressing the separation of the boundary layer from the suction-side surface 14. Therefore, it is possible to generate lift up to a high angle of attack. In other words, the high lift characteristics of not losing speed until the high angle of attack is reached can be achieved. Further, by setting the trailing edge thickness ratio to 5% or above, section modulus of the wind turbine blade 1 is improved, thereby attaining a lighter wind turbine blade 1 while maintaining the strength of the wind turbine blade 1.

Meanwhile, in the area of $40\% \leq X \leq 50\%$, by setting the trailing edge thickness ratio Y to not greater than the upper limit $Y_H (=1.5X-30)$, it is possible to attain sufficient effect of improving the lift-drag ratio at least in some area of the angle of attack.

In the range where the blade thickness ratio X is not less than 35% and no greater than 40%, the lower limit $Y_L$ of the allowable area 30 is $Y_L = X - 35$ and the upper limit $Y_H$ of the allowable area 30 is $Y_H = 4X - 130$. More specifically, in such a case that the blade thickness ratio X is not less than 35% and no greater than 40%, the shape of the flatback airfoil is determined so that the blade thickness ratio X and the trailing edge thickness ratio Y satisfy a relationship of $X - 35 \leq Y \leq 4X - 130$.

In this manner, by setting the trailing edge thickness ratio Y to not less than X−35, it is possible to effectively delay separation of the boundary layer from the suction-side surface 14 by the negative pressure generated due to the wake behind the trailing edge 8, thereby generating the lift to the high angle of attack. Further, by setting the trailing edge thickness ratio Y to not less than X−35, section modulus of the wind turbine blade 1 is improved, thereby attaining a lighter wind turbine blade 1 while maintaining the strength of the wind turbine blade 1.

Meanwhile, by setting the trailing edge thickness ratio Y to not greater than 4X−130, it is possible to attain sufficient effect of improving the lift-drag ratio at least in some area of the angle of attack.

In the area which is close to the blade tip part 2 and where the blade thickness ratio X is below 35%, as the blade thickness ratio X decreases toward the flatback starting point 11 (see FIG. 2), the trailing edge thickness ratio Y is gradually reduced. In this process, the trailing edge ratio Y may be gradually reduced so that the trailing edge thickness ratio Y becomes not greater than the upper limit $Y_H(=X-25)$ as shown in FIG. 5.

For the convenience of production, the thickness of the trailing edge 8 cannot be reduced to zero and thus, the trailing edge thickness ratio Y does not have to be reduced completely to zero on the blade tip side of the flatback starting point 11.

In the embodiment, the allowable area 30 in the range of the blade thickness ratio X being 35 to 50% is divided into three areas, a first area 32, a second area 34 and a third area 36. Depending on a specification of the wind turbine blade 1, an area is selected from the first to third areas 32, 34, 36 and the shape of the flatback airfoil 10 is determined.

In the range of the blade thickness ratio X being 40%≦X≦50%, the first area 32 is the area where the relationship of X−20≦Y≦1.5X−30 is satisfied, the second area 34 being the area where the relationship of 0.5X−5≦Y≦X−20 is satisfied, the third area 36 being the area where the relationship of 5%≦Y≦0.5X−5 is satisfied.

Further, in the range of the blade thickness ratio X being 35%≦X<40%, the first area 32 is the area where the relationship of 3X−100≦Y≦4X−130 is satisfied, the second area 34 being the area where the relationship of 2X−65<Y<3X−100 is satisfied, the third area 36 being the area where the relationship of X−35≦Y≦2X−65 is satisfied.

A process of selecting the area (32, 34, 36) depending on a specification of the wind turbine blade 1 is now explained.

Figure 6:
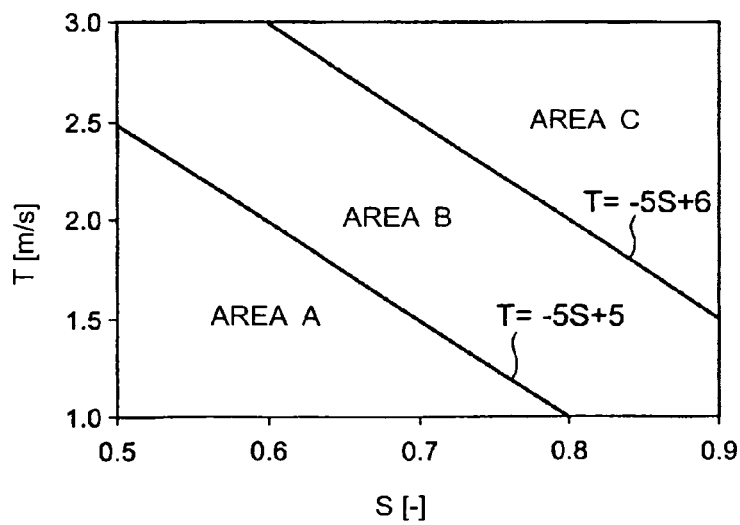
FIG. 6 is a map used to select the setting area of FIG. 5 from first to third areas.

FIG. 6 is a map used to select the setting area from the first area 32, the second area 34 and the third area 36. In the map of FIG. 6, a horizontal axis indicates a parameter S and a vertical axis indicates a parameter T.

The parameter S is a parameter expressed by $S=L_{CMAX}/R$, $L_{CMAX}$ being a maximum chord length (see FIG. 1), R being a rotation radius of the wind turbine blade 1 (see FIG. 1). The parameter S is indicative of sensitivity of the angle of attack a to the change of the wind speed (an amount of increase in the angle of attack a to an amount of increase in the wind speed on an infinite upstream side).

Meanwhile, T is a parameter expressed by $T=RQ*Lr/R$, RQ being a circumferential speed of the blade tip part 2 (see FIG. 1), Lr being a representative chord length. The parameter T is indicative of a difference between the wind speed $V_2$ at which the rated rotation speed is reached and the rated wind speed $V_3$ (the wind speed at which the rated power is reached).

In the map of FIG. 6, areas A, B and C are shown, which are divided by a straight lines expressed by T=−5S+5 and another straight line expressed by T=−5S+6. More specifically, the area A is the area where T≦−5S+5 is satisfied, the area B being the area where −5S+5<T<−5S+6 is satisfied, the area C being the area where T≧−5S+6 is satisfied.

In such a case that the parameters S and T satisfy the relationship of T≦−5S+5 (the area A), the parameter S is small for the same parameter T in comparison to the case of T≧−5S+6 (the area C). More specifically, the sensitivity of the angle of attack a to the change of the wind speed is high. The parameter T expresses the difference between the wind speed at which the rated rotation speed is reached and the rated wind speed. For the same parameter S, the parameter T (the wind speed $V_2$ at which the rated rotation speed is reached) of the area A is small in comparison to the area C. In other words, the difference of the wind speed, $V_3-V_2$, is large. Thus, in the case of using the wind turbine blade 1 whose parameters S and T belong to the area A, the first area 32 is selected from the allowable area 30 of FIG. 5 and hence the shape of the flatback airfoil 10 is determined. More specifically, in the rage of the blade thickness ratio X being 40%≦X≦50%, the shape of the flatback airfoil 10 is determined so that the relationship of X−20≦Y≦1.5X−30 is satisfied, and in the range of the blade thickness ratio X being 35%≦X<40%, the shape of the flatback airfoil 10 is determined so that the relationship of 3X−100≦Y≦4X−130 is satisfied. This enables the trailing edge thickness ratio Y to be set comparatively high within the allowable area 30 and thus, the separation of the boundary layer on the suction-side surface 14 can be suppressed to high angle of attack a.

In contrast, in such a case that the parameters S and T satisfy the relationship of T≧−5S+6 (the area C), the parameter S is large for the same parameter T in comparison to the case of T≦−5S+5 (the area A) where T is the difference between the wind speed at which the rated rotation speed is reached and the rated wind speed. More specifically, the sensitivity of the angle of attack a to the change of the wind speed is low. For the same parameter S, the parameter T (the wind speed $V_2$ at which the rated rotation speed is reached) of the area A is large in comparison to the area C. In other words, the difference of the wind speed, $V_3-V_2$, is small. Thus, in the case of using the wind turbine blade 1 whose parameters S and T belong to the area C, the third area 36 is selected from the allowable area 30 of FIG. 5 and hence the shape of the flatback airfoil 10 is determined. More specifically, in the rage of the blade thickness ratio X being 40%≦X≦50%, the shape of the flatback airfoil 10 is determined so that the relationship of 5%≦Y≦0.5X−5 is satisfied, and in the range of the blade thickness ratio X being 35%≦X<40%, the shape of the flatback airfoil 10 is determined so that the relationship of X−35≦Y≦2X−65 is satisfied. This enables the trailing edge thickness ratio Y to be set comparatively low within the allowable area 30 and thus, the trailing edge thickness $t_{TE}$ is minimized and the lift is increased while reducing the increase of the drag.

In such a case that the parameters S and T satisfy the relationship of −5S+6<T<−5S+5 (the area B), the second area 34 is selected from the allowable area 30 of FIG. 5. More specifically, in the area where the blade thickness ratio X is 40%≦X≦50%, the shape of the flatback airfoil 10 is determined so that the relationship of 0.5X−5<Y<X−20 is satisfied, and in the range of the blade thickness ratio X being 35%≦X<40%, the shape of the flatback airfoil 10 is determined so that the relationship of 2X−65<Y<3X−100 is satisfied. This enables the trailing edge thickness ratio Y to be set to a moderate value within the allowable area 30 and, the increase of the drag can be suppressed to a certain extent while suppressing the separation of the boundary layer to a certain angle of attack a.

Figure 7:
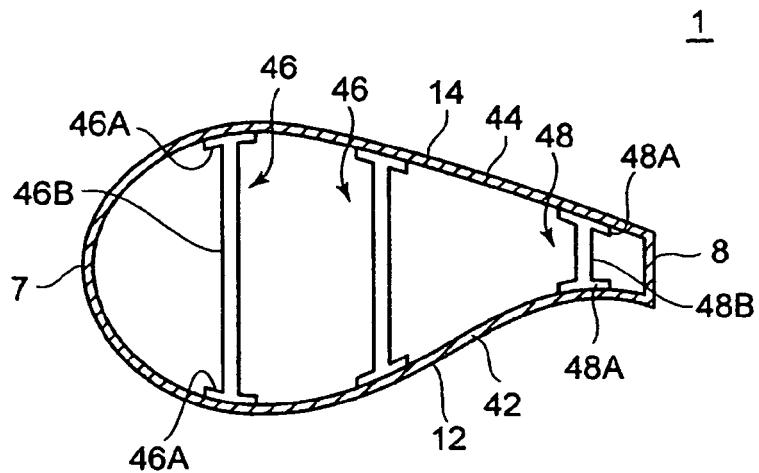
FIG. 7 shows an example of an inner structure of a wind turbine blade.
Figure 8A:
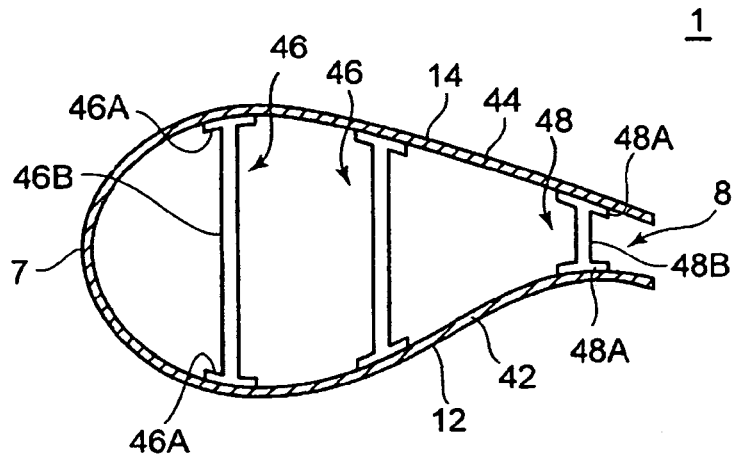
FIG. 8 shows another example of the inner structure of the wind turbine blade.
Figure 8B:
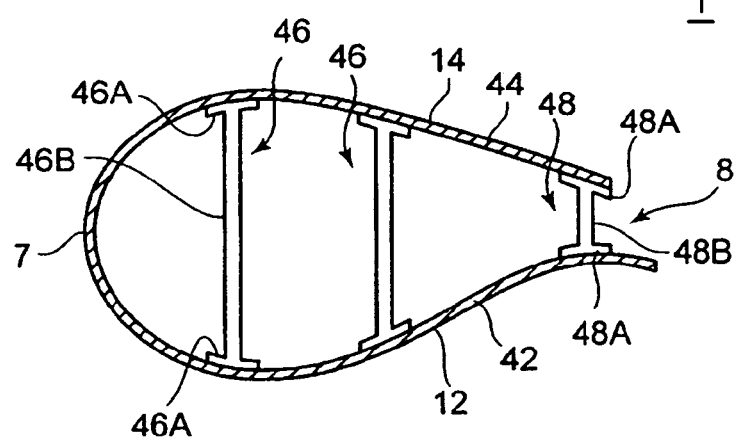

The inner structure of the wind turbine blade 1 having the flatback airfoil 10 of the above-described shape. FIG. 7 shows an example of the inner structure of the wind turbine blade 1. FIG. 8A and FIG. 8B show another example of the inner structure of the wind turbine blade 1.

The wind turbine blade illustrated in FIG. 7 and FIG. 8 has a cross-sectional shape which is defined by the above flatback airfoil 10. The wind turbine blade 1 includes a pressure-side outer shell 42 forming a pressure-side surface 12 of the flatback airfoil 10, a suction-side outer shell 44 forming a suction-side surface 14 of the flatback airfoil 10 and a main spar 46 and a trailing-edge spar 48 which are provided between the pressure-side outer shell 42 and the suction-side outer shell 44.

The main spar 46 extends in the longitudinal direction of the wind turbine blade 1 in an interior of the wind turbine blade 1 between the pressure-side outer shell 42 and the suction-side outer shell 44. The main spar 46 is formed by spar caps 46A which are fixed by adhesion bonding to inner surfaces of the pressure-side outer shell 42 and the suction-side outer shell 44 respectively, and a shear web 46B which is provided between the spar caps 46A.

The trailing edge spar 48 is provided closer to the trailing edge 8 than the main spar 46 is. In a similar manner to the main spar 46, the trailing edge spar 48 extends in the longitudinal direction of the wind turbine blade 1 in the interior of the wind turbine blade 1 between the pressure-side outer shell 42 and the suction-side outer shell 44. The trailing edge spar 48 is formed by spar caps 48A which are fixed by adhesive bonding to the inner surfaces of the pressure-side outer shell 42 and the suction-side outer shell 44 respectively, and a shear web 48B which is provided between the spar caps 48A.

The flatback airfoil 10 may be closed at the trailing edge 8 such that the pressure-side outer shell 42 and the suction-side outer shell 44 contact each other as shown in FIG. 7, or may be open at the trailing edge 8 such that the pressure-side outer shell 42 and the suction-side outer shell 44 do not contact each other as shown in FIG. 8A and FIG. 8B.

The pressure-side outer shell 42 and the suction-side outer shell 44 are joined via the trailing edge spar 48 and thus, even if the flatback airfoil 10 is open at the trailing edge 8, it is still possible to achieve enough strength. Further, the open trailing edge 8 does not significantly affect a flow of the wind on the pressure side and the suction side and thus, aerodynamic characteristics can be maintained. The open trailing edge 8 is also advantageous when checking an attachment state of the trailing edge spar 48 (an adhesion state between the spar cap 48A and the inner surface of the outer shell) as the trailing edge 8 is open and the trailing edge spar 48 is exposed to outside.

Alternatively, at least one of the pressure-side outer shell 42 and the suction-side outer shell 44 may not extend beyond the trailing edge spar 48 toward the downstream side. For instance, as shown in FIG. 8B, the suction-side outer shell 44 extends to a position of the trailing edge spar 48 but not beyond the position toward the downstream side.

Second Embodiment

A wind turbine blade regarding a second embodiment is now explained. The wind turbine blade of the second embodiment is substantially the same as the wind turbine blade 1 of the first embodiment expect that the flatback airfoil 10 of the airfoil part 6 is additionally provided with an extension portion. Thus, the extension portion different from the wind turbine blade 1 of the first embodiment is mainly explained.

Figure 9:
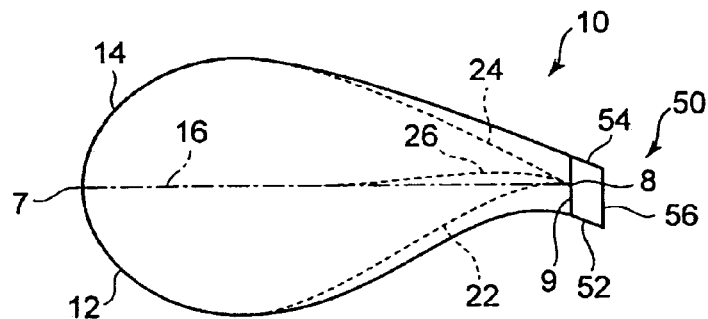
FIG. 9 shows an example of the wind turbine blade regarding a second embodiment.

FIG. 9 shows an example of the extension portion which is added to the flatback airfoil 10. As shown in FIG. 9, the extension portion 50 extends behind the trailing edge 8 of the flatback airfoil 10. The extension portion 50 includes a pressure-side extension surface 52 and a suction-side extension surface 54. The pressure-side extension surface 52 extends beyond the trailing edge 8 from the pressure-side surface 12 of the flatback airfoil 10 and the suction-side extension surface 54 extends beyond the trailing edge 8 from the suction-side surface 14 of the flatback airfoil 10.

The shape of the flatback airfoil 10 may be determined in a manner similar to the first embodiment.

The pressure-side extension surface 52 is a concavely-curved or flat surface that extends in a continuous manner from the pressure-side surface 12 of the flatback airfoil 10. The pressure-side extension surface 52 inclines with respect to the chord 16 such as to move away from the chord 16 toward a back end surface 56 of the extension portion 50. Thus, the pressure-side extension surface 52 deflects the flow of the air on the pressure side of the flatback airfoil 10 further downward (in a direction away from the pressure-side surface 12) and the lift acting on the wind turbine blade 1 increases.

The back end surface 56 of the extension portion 50 is disposed approximately parallel to the end surface (trailing edge surface) 9 of the trailing edge 8 of the flatback airfoil 10.

The extension portion 50 may be added when designing the airfoil of the wind turbine blade, so as to change the aerodynamic characteristics of the flatback airfoil 10. More specifically, for the purpose of improving the aerodynamic characteristics, the airfoil of the wind turbine blade may be designed with the extension portion 50 added to the flatback airfoil 10 and the pressure-side outer shell 42 and the suction-side outer shell 44 (see FIG. 7 and FIG. 8) may be shaped so as to obtain the designed airfoil. By this, it is possible to produce the wind turbine blade at low cost in a easy method, which has aerodynamic characteristics improved by the pressure-side extension surface 52 of the extension portion 50.

Alternatively, the extension portion 50 may be formed separately from the flatback airfoil 10 and then added to the flatback airfoil 10 when producing or altering the wind turbine blade. In such case, the extension portion may be formed of fiber-reinforced plastic and fixed by adhesive bonding to the flatback airfoil 10. In this manner, forming the extension portion 50 separately from the flatback airfoil 10 has the following advantages.

First, depending on the shape of the pressure-side extension surface 52, it is difficult to form the extension portion 50 integrally with the flatback airfoil 10, which may restrict the shape of the pressure-side extension surface 52. Therefore, forming the extension portion 50 as a separate member allows the pressure-side extension surface 52 to have any shape. By this, the aerodynamic characteristics of the flatback airfoil 10 are further improved.

Further, depending on where the wind turbine is installed, an appropriate chord length $L_C$ of the wind turbine is different. Thus, it is necessary in some cases to achieve the chord length LC which is appropriate for respective locations. For instance, in an area near a residential district and an urban district where the noise of the wind turbine must be minimized, from the perspective of reducing the noise, the rated rotation speed of the wind turbine is set lower and accordingly the chord length LC is set longer in accordance with the reduced rated rotation speed. In contrast, in an area such as a mountain area where the noise is not an issue, from the perspective of facilitating the transportation of the wind turbine blades, the chord length $L_C$ is set shorter. In view of this, by forming the extension portion 50 as a separate member separately from the flatback airfoil 10, the chord lengths LC appropriate for respective locations can be achieved while using a common mold for wind turbines blades with different specifications depending on the installation locations.

Further, the flatback airfoils have been actively studied in recent years. However, there is not enough data on wind-tunnel test regarding the flatback airfoils and the flatback airfoil may not have desired aerodynamic characteristic, particularly lift-drag ratio. In such case, for the purpose of complimenting the aerodynamic characteristics of the flatback airfoil 10, the extension portion 50 may be added to the flatback airfoil to achieve the desired aerodynamic characteristics.

Furthermore, by attaching to the flatback airfoil 10 the extension portion 50 as the separate member formed separately from the flatback airfoil 10, it is possible to improve the rigidity of the trailing edge 8 of the flatback airfoil 10, a buckling strength of the wind turbine blade and a strength of adhesive bonding of the pressure-side outer shell 42 and the suction-side outer shell 44.

The extension portion 50 is not limited to the example shown in FIG. 9 and may have a variety of shapes. FIG. 10 shows different shapes of the extension portions 50.

Figure 10A:
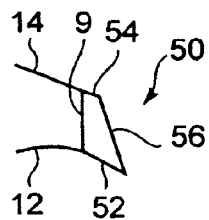
FIG. 10 shows another example of the wind turbine blade regarding the second embodiment.

In an example of FIG. 10A, the back end surface 56 of the extension portion 50 inclines with respect to the trailing edge surface 9 of the flatback airfoil 10 and the pressure-side extension surface 52 extends longer than the suction-side extension surface 54. Thus, the lift is further improved by the longer pressure-side extension surface 52.

Figure 10B:
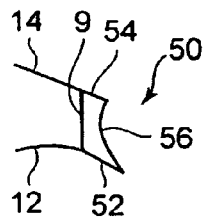

In an example of FIG. 10B, the back end surface 56 of the extension portion 50 is concave and an angle between the back end surface 56 and the suction-side extension surface 54 is smaller than an angle between the suction-side surface 14 and the trailing edge surface 9 of the flatback airfoil 10. By this, an intersection point where the back end surface 56 intersects with the suction-side extension surface 54 is altered toward an acute angle and the negative pressure downstream of the extension portion 50 draws the flow of the air flowing along the suction-side surface 14 more strongly toward the suction-side surface 14 (as well as the suction-side extension surface 54) and delays the separation of the boundary layer from the suction-side surface 14.

Figure 10C:
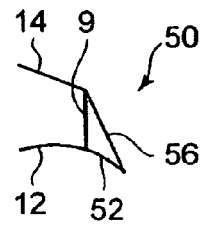

In an example of FIG. 10C, the extension portion is not provided with the suction-side extension surface 54 and the back end surface 56 of the extension portion 50 is connected to the intersection point 9 between the suction-side surface 14 and the trailing edge surface 9 of the flatback airfoil 10. Thus, the lift is further improved by the pressure-side extension surface 52. Further, the pressure-side extension surface 52 is a concavely curved surface extending continuously from the pressure-side surface 12 of the flatback airfoil 10.

Figure 10D:
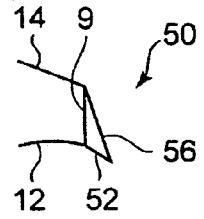

In an example of FIG. 10D, except that the pressure-side extension surface 52 of the extension portion 50 is flat, the extension portion 50 is substantially the same as the extension portion 50 of FIG. 10C.

Figure 10E:
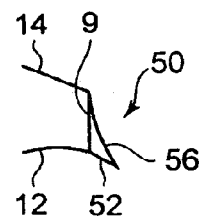

In an example of FIG. 10E, the back end surface 56 of the extension portion 50 is formed into a concave surface and the angle between the back end surface 56 and the suction-side extension surface 54 is set smaller than the angle between the suction-side surface 14 and the trailing edge surface 9 of the flatback airfoil 10. The rest of the extension portion is substantially the same as that of the FIG. 10D.

Figure 10F:
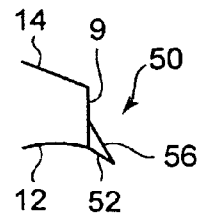

In an example of FIG. 10F, the back end surface 56 of the extension portion 50 is connected to a point of the trailing edge surface 9 of the flatback airfoil 10 (i.e. the point of the trailing edge surface 9 closer to the pressure side than the intersection point between the trailing edge surface 9 and the suction-side surface 14) such that the intersection point between the trailing edge surface 9 and the suction-side surface 14 of the flatback airfoil 10 is exposed. Thus, it is possible to attain an effect of improved lift by the pressure-side extension surface 52 of the extension portion 50 without an adverse effect on the suppression effect of the separation of the boundary layer of the flatback airfoil 10 at the intersection point between the trailing edge surface 9 and the suction-side surface 14.

Figure 10G:
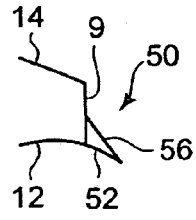

In an example of FIG. 10G, the pressure-side extension surface 52 of the extension portion 50 is a concavely curved surface instead of a flat surface. The rest of the extension portion 50 is substantially the same as that of FIG. 10F.

Figure 10H:
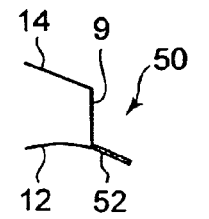

In an example of FIG. 10H, the extension portion 50 is formed of a plate-like member and is connected to an intersection point between the trailing edge surface 9 and the pressure-side surface 12 of the flatback airfoil 10. A surface of the extension portion 50 formed of the plate-like member that is on the pressure side, constitutes the pressure-side extension surface 52.

In this manner, by using the extension portion 50 formed of the plate-like member, the intersection point between the trailing edge surface 9 and the suction-side surface 14 of the flatback airfoil 10 is exposed. Thus, it is possible to attain an effect of improved lift by the pressure-side extension surface 52 of the extension portion 50 without an adverse impact on the suppression effect of the separation of the boundary layer of the flatback airfoil 10 at the intersection point between the trailing edge surface 9 and the suction-side surface 14.

Figure 10I:
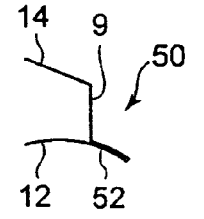

In an example of FIG. 10I, the pressure-side extension surface 52 of the extension portion 50 is a concavely curved surface instead of a flat surface. The rest of the extension portion 50 is substantially the same as that of FIG. 10F.

Third Embodiment

A wind turbine blade regarding a third embodiment is now explained. The wind turbine blade of the third embodiment is substantially the same as the wind turbine blade 1 of the first embodiment expect that a covering member is provided to cover a part including and around the trailing edge 8 of the flatback airfoil 10 of the airfoil part 6. Thus, the covering member which is different from the wind turbine blade 1 of the first embodiment is mainly explained.

Figure 11:
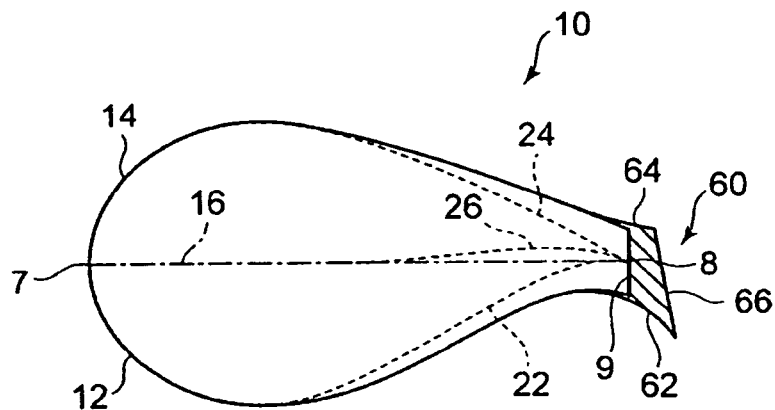
FIG. 11 shows an example of the wind turbine blade regarding a third embodiment.
Figure 12:
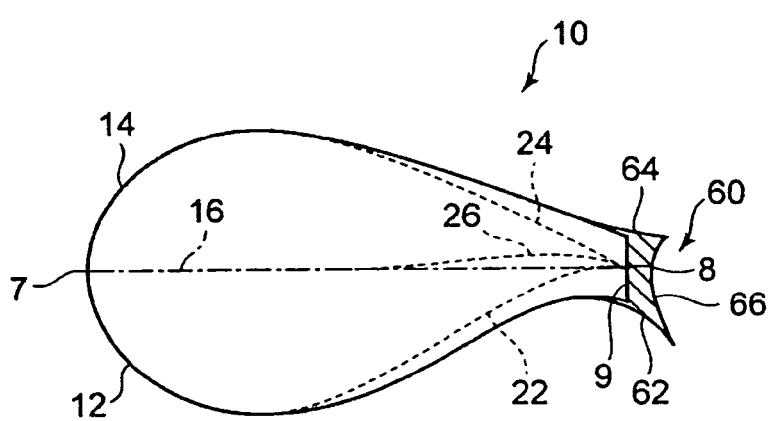
FIG. 12 shows another example of the wind turbine blade regarding the third embodiment.

FIG. 11 shows an example of the covering member which covers the part including and around the trailing edge 8 of the flatback airfoil 10. FIG. 12 shows another example of the covering member which covers the part including and around the trailing edge 8 of the flatback airfoil 10.

As shown in FIG. 11, the covering member 60 covers the trailing edge surface 9 of the flatback airfoil 10, the pressure-side surface 12 and parts of the pressure-side surface 12 and the suction-side surface 14 of the flatback airfoil that are on the trailing-edge side. An outer surface 62 of the covering member 60 on the pressure side extends in a continuous manner from the pressure-side surface 12 of the flatback airfoil 10. In the same manner, an outer surface 64 of the covering member 60 on the suction side extends in a continuous manner from the suction-side surface 14 of the flatback airfoil 10.

Further, the shape of the flatback airfoil 10 may be determined in a manner similar to the first embodiment.

The outer surface 62 of the covering member 60 on the pressure side is a concavely curved surface or a flat surface that extends continuously from the pressure side surface 12 of the flatback airfoil 10. The outer surface 62 of the covering member 60 on the pressure side inclines with respect to the chord 16 of the flatback airfoil 10 such as to move away from the chord 16 (in a direction to the pressure side) as a back end surface 66 of the covering member 60 approaches. Thus, the outer surface 62 of the covering ember 60 deflects the flow of the air on the pressure side of the flatback airfoil 10 further downward (in a direction away from the pressure-side surface 12) and the lift acting on the wind turbine blade 1 increases.

Furthermore, by covering the part including and around the trailing edge 8 of the flatback airfoil 10 by the covering member 60, it is possible to improve the rigidity of the trailing edge 8 of the flatback airfoil 10 and a buckling strength of the wind turbine blade.

In the example shown in FIG. 11, the back end surface 66 of the covering member 60 is a flat surface. However, the shape of the back end surface 66 is not limited to this, and may be a concave surface as shown in FIG. 12. In this manner, by forming the back end surface 66 of the covering member 60 as a concave surface, the angle between the back end surface 66 and the outer surface 64 on the suction side may be set smaller than the angle between the suction side surface 14 and the trailing edge surface 9 of the flatback airfoil 10. By this, an intersection point where the back end surface 66 intersects with the outer surface 64 on the suction side becomes closer to an acute angle and the negative pressure downstream of the covering member 60 draws the flow of the air flowing along the suction-side surface 14 (as well as the outer surface 64 on the suction side) more strongly toward the suction-side surface 14 and delays the separation of the boundary layer from the suction side.

Fourth Embodiment

A wind turbine blade regarding a fourth embodiment is now explained. The wind turbine blade of the fourth embodiment includes the extension portion additionally attached to the flatback airfoil 10 explained in reference to FIG. 4A to FIG. 4C (the flatback airfoil formed by varying the angle θ between the end surface 9 and the orthogonal plane orthogonal to the chord 16). The rest is substantially the same as the wind turbine blade 1 of the first embodiment and thus, mainly the difference from the wind turbine blade 1 of the first embodiment is explained here.

Figure 13:
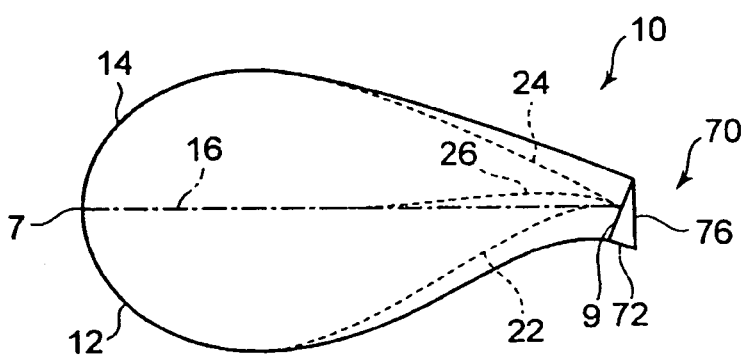
FIG. 13 shows an example of the wind turbine blade regarding a fourth embodiment.
Figure 16A:
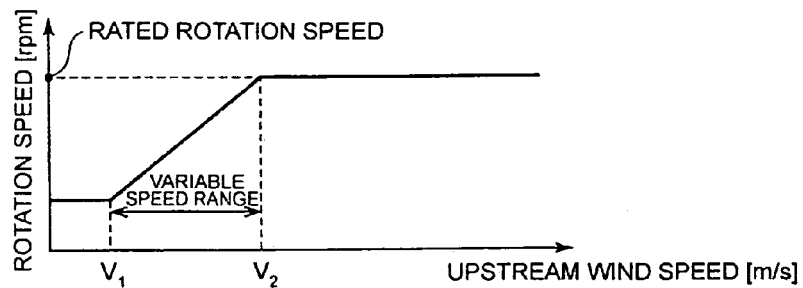
FIG. 16A to FIG. 16D show operation conditions of a general wind turbine.
Figure 16B:
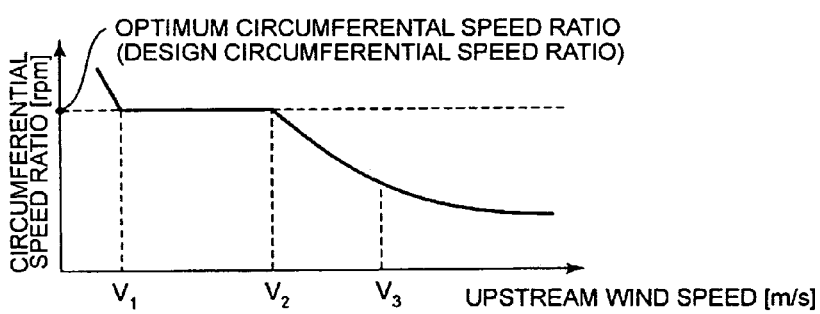
Figure 16C:
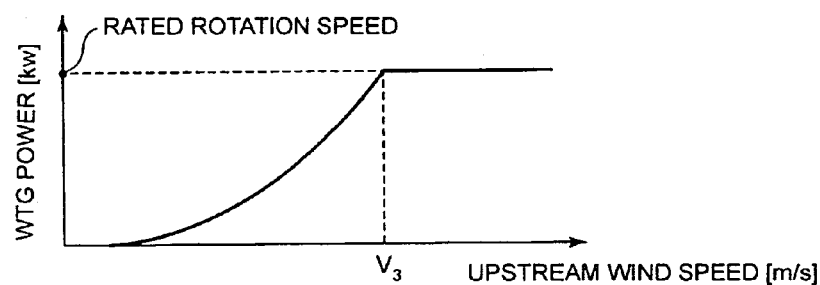
Figure 16D:
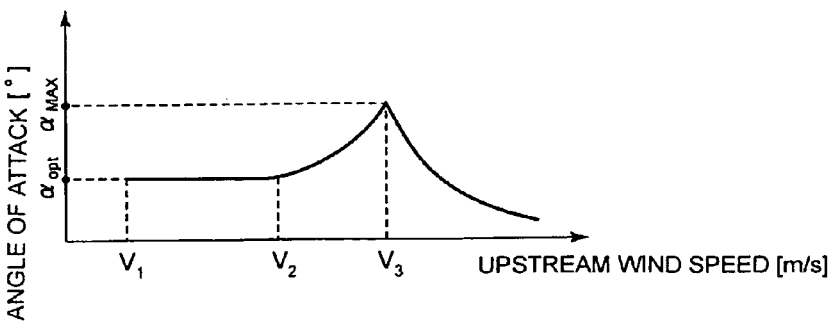

FIG. 13 shows an example of the wind turbine blade of the fourth embodiment. FIG. 14 shows another example of the wind turbine blade of the fourth embodiment.

In the wind turbine blade of the fourth embodiment, as explained in the first embodiment in reference to FIG. 4A to FIG. 4C, the flatback airfoil 10 is formed by increasing the angle θ between the back end surface 9 and the orthogonal plane 17 in the longitudinal direction of the blade as it becomes closer to the blade tip part 4. By this, the back end surface 9 of the flatback airfoil 10 can be formed into a flat or curved surface that is not twisted. Thus, the wind turbine blade 1 can be produced easily.

Changing the angle θ to form the backend surface 9 into the untwisted flat or curved surface may restrict the freedom of choosing the shape of the trailing edge 8 of the flatback airfoil 10.

Therefore, in the fourth embodiment, an extension portion 70 is provided to extend behind from the trailing edge 8 and the shape of the trailing edge 8 may be arbitrarily adjusted by means of the extension portion 70.

The extension portion 70 includes a pressure-side extension surface 72 which extends continuously behind the trailing edge 8 of the flatback airfoil 10. The pressure-side extension surface 72 is a concavely-curved or flat surface extending continuously from the pressure-side surface 12 of the flatback airfoil 10. The pressure-side extension surface 72 inclines with respect to the chord 16 such as to separate from the chord 16 (toward the pressure side) as it gets closer to the back end surface 76 of the extension portion 70. Thus, the pressure-side extension surface 72 deflects the flow of the air on the pressure side of the flatback airfoil 10 further downward (in a direction away from the pressure-side surface 12) and the lift acting on the wind turbine blade 1 increases.

Further, the shape of the extension portion 70 is not limited to the example shown in FIG. 13 and may be any shape.

For instance, as shown in FIG. 14A, the pressure-side extension surface 72 of the extension portion 70 may be a concavely curved surface. In the examples shown in FIG. 14B and FIG. 14A, a back end surface 76 of the extension portion 70 is connected to a point of the trailing edge surface 9 of the flatback airfoil 10 (i.e. the point of the trailing edge surface 9 closer to the pressure side than the intersection point between the trailing edge surface 9 and the suction-side surface 14) such that the intersection point between the trailing edge surface 9 and the suction-side surface 14 of the flatback airfoil 10 is exposed. Thus, it is possible to attain an effect of improved lift by the pressure-side extension surface 52 of the extension portion 50 without an adverse impact on the suppression effect of the separation of the boundary layer of the flatback airfoil 10 at the intersection point between the trailing edge surface 9 and the suction-side surface 14.

As described above, in the first through fourth embodiments, the airfoil part 6 is formed as the flatback airfoil 10 at least in the area in the longitudinal direction of the wind turbine blade where the blade thickness ratio X is 40%≦X≦50%, X indicating the ratio of a maximum thickness $t_{MAX}$ to the chord length $L_C$, and in the area of the blade thickness ratio X being 40%≦X≦50%, the flatback airfoil 10 has the trailing edge thickness ratio Y of 5%≦Y≦$Y_H$(=1.5X−30) %, Y indicating the ratio of the trailing edge thickness $t_{TE}$ to the maximum thickness $t_{MAX}$.

According to the first to fourth embodiments, in the area which is comparatively close to the blade root side where the blade thickness ratio X is not less than 40% and not greater than 50%, the flatback airfoil is formed with a blunt trailing edge, hence effectively improving the characteristics of lift-drag ratio.

Further, in the area where the blade thickness ratio X is 40 to 50%, the trailing edge thickness ratio Y is set to 5% or higher and thus, it is possible to generate the lift up to the high angle of attack and to improve the section modulus of the wind turbine blade. As a result, it is possible to reduce the weight of the wind turbine blade while maintaining the strength of the wind turbine blade.

Furthermore, in the area of 40%≦X≦50%, by setting the trailing edge thickness ratio Y to not greater than the upper limit $Y_H$(=1.5X−30), it is possible to attain sufficient effect of improving the lift-drag ratio at least in some area of the angle of attack.

While the present invention has been described with reference to the above exemplary embodiments, it is obvious to those skilled in the art that various changes may be made without departing from the scope of the invention. For instance, the first to fourth embodiments can be arbitrarily combined.

REFERENCE SIGNS LIST

| | |
|---|---|
| 1 | WIND TURBINE BLADE |
| 2 | BLADE TIP PART |
| 4 | BLADE ROOT PART |
| 6 | AIRFOIL PART |
| 7 | LEADING EDGE |
| 8 | TRAILING EDGE |
| 9 | END SURFACE (TRAILING EDGE SURFACE) |
| 10 | FLATBACK AIRFOIL |
| 12 | PRESSURE-SIDE SURFACE |
| 14 | SUCTION-SIDE SURFACE |

-continued

| | |
|---|---|
| 16 | CHORD |
| 17 | ORTHOGONAL PLANE |
| 20 | STANDARD AIRFOIL |
| 22 | PRESSURE-SIDE SURFACE |
| 24 | SUCTION-SIDE SURFACE |
| 26 | CAMBER LINE |
| 30 | ALLOWABLE AREA |
| 32 | FIRST AREA |
| 34 | SECOND AREA |
| 36 | THIRD AREA |
| 42 | PRESSURE-SIDE OUTER SHELL |
| 44 | SUCTION-SIDE OUTER SHELL |
| 46 | MAIN SPAR |
| 46A | SPAR CAP |
| 46B | SHEAR WEB |
| 48 | TRAILING EDGE SPAR |
| 48A | SPAR CAP |
| 48B | SHEAR WEB |
| 50 | EXTENSION PORTION |
| 52 | PRESSURE-SIDE EXTENSION SURFACE |
| 54 | SUCTION-SIDE EXTENSION SURFACE |
| 56 | BACK END SURFACE |
| 60 | COVERING MEMBER |
| 62 | OUTER SURFACE ON PRESSURE SIDE |
| 64 | OUTER SURFACE ON SUCTION SIDE |
| 66 | BACK END SURFACE |
| 70 | EXTENSION PORTION |
| 72 | PRESSURE-SIDE EXTENSION SURFACE |
| 76 | BACK END SURFACE |
| 100 | WIND TURBINE BLADE |
| 102 | DOWNSTREAM-SIDE AREA |
| 110 | WIND TURBINE GENERATOR |
| 112 | HUB |
| 114 | NACELLE |
| 116 | TOWER |

The invention claimed is:

1. A wind turbine blade comprising:
a blade tip part;
a blade root part which is connected to a hub of a wind turbine; and
an airfoil part which is disposed between the blade tip part and the blade root part and which includes a flatback airfoil with a blunt trailing edge at least in an area in a longitudinal direction of the wind turbine blade where a blade thickness ratio X is not less than 40% and not greater than 50%, X indicating a ratio of a maximum thickness $t_{MAX}$ to a chord length $L_C$,
wherein, in the area where the blade thickness ratio X is not less than 40% and not greater than 50%, the flatback airfoil has a trailing edge thickness ratio Y which is not less than 5% and not greater than $Y_H$%, Y indicating a ratio of a trailing edge thickness $t_{TE}$ to the maximum thickness $t_{MAX}$, and
wherein $Y_H$ has a relationship of $Y_H=1.5X-30$ with the blade thickness ratio X.

2. The wind turbine blade according to claim 1,
wherein, in such a case that a relationship $T \leq -5S+5$ is satisfied where S is a parameter expressed by $S=L_{CMAX}/R$, $L_{CMAX}$ being a maximum chord length, R being a rotation radius of the wind turbine blade and T is a parameter expressed by $T=RQ*Lr/R$, RQ being a circumferential speed of the blade tip part, Lr being a representative chord length, the trailing edge thickness ratio Y of the flatback airfoil has a relationship of $X-20 \leq Y \leq 1.5X-30$ in the a where the blade thickness ratio X is not less than 40% and not greater than 50%,
wherein, in such a case that a relationship $T \geq -5S+6$ is satisfied, the trailing edge thickness ratio Y of the flatback airfoil is expressed by $5 \leq Y \leq 0.5X-5$ in the area where the blade thickness ratio X is not less than 40% and not greater than 50%,
wherein, in such a case that a relationship $-5S+5<T<-5S+6$ is satisfied, the trailing edge thickness ratio Y of the flatback airfoil is expressed by $0.5X-5<Y<X-20$ in the area where the blade thickness ratio X is not less than 40% and not greater than 50%, and
wherein the representative chord length is a chord length at a blade radius position r where a ratio of the chord length to the rotation radius R is 0.8.

3. The wind turbine blade according to claim 1,
wherein, in an area where the blade thickness ratio X is not less than 35% and not greater than 40%, the blade thickness ratio X and the trailing edge thickness ratio Y have a relationship of $X-35 \leq Y \leq 4X-130$.

4. The wind turbine blade according to claim 1,
wherein the flatback airfoil has a cross-sectional shape with the blunt trailing edge formed by expanding a distance between a pressure-side surface and a suction-side surface of a standard airfoil with a sharp trailing edge,
wherein the airfoil part includes a pressure-side extension surface which is one of a concavely-curved surface and a flat surface that extend in a continuous manner behind the trailing edge of the flatback airfoil from the pressure-side surface of the flatback airfoil, and
wherein the pressure-side extension surface inclines with respect to a chord of the flatback airfoil such as to separate from the chord toward a downstream side.

5. The wind turbine blade according to claim 4,
wherein the airfoil part includes a suction-side extension surface which extends behind the trailing edge of the flatback airfoil from the suction-side surface of the flatback airfoil,
wherein the pressure-side extension surface and the suction-side extension surface are respectively an outer surface on a pressure-side and an outer surface on a suction side of an extension portion which extends behind the trailing edge of the flatback airfoil, and
wherein an angle between a back end surface of the extension portion and the suction-side extension surface is smaller than an angle between the suction-side surface and an end surface of the trailing edge of the flatback airfoil.

6. The wind turbine blade according to claim 4,
wherein the pressure-side extension surface is an outer surface on a pressure-side of an extension portion which extends behind the trailing edge of the flatback airfoil,
wherein an outer surface of the extension portion on the suction side intersects with an end surface of the trailing edge of the flatback airfoil at a position closer to the pressure side than an intersection point where the suction-side surface of the flatback airfoil intersects with the trailing edge of the flatback airfoil, and
wherein the intersection point between the suction-side surface and the trailing edge of the flatback airfoil is not covered by the extension portion.

7. The wind turbine blade according to claim 1,
wherein the flatback airfoil has a cross-sectional shape with a blunt trailing edge formed by expanding a distance between a pressure-side surface and a suction-side surface of a standard airfoil with a sharp trailing edge,
wherein the airfoil part is provided with a covering member which covers the trailing edge of the flatback airfoil and parts of the pressure-side and the suction-side of the flatback airfoil that are on the trailing-edge side, and wherein an outer surface of the covering member on the pressure side is one of a concavely-curved surface and a flat surface that extend in a continuous manner from the pressure-side surface of the flatback airfoil, said outer surface of the covering member inclining with respect to a chord of the flatback airfoil such as to separate from the chord toward a downstream side.

8. The wind turbine blade according to claim 1,
wherein the airfoil part is twisted in a longitudinal direction of the wind turbine blade, and
wherein an end surface of the trailing edge of the flatback airfoil is a flat or curved surface not twisted in the longitudinal direction by varying an angle θ between the end surface of the trailing edge of the flatback airfoil and a plane orthogonal to the chord of the flatback airfoil in relation to the longitudinal direction of the wind turbine blade.

9. The wind turbine blade according to claim 8,
wherein the angle θ increases with a distance from the blade tip part.

10. The wind turbine blade according to claim 1,
wherein the flatback airfoil is open at the trailing edge such that a pressure-side outer shell forming a pressure-side surface of the flatback airfoil and a suction-side outer shell forming a suction-side surface of the flatback airfoil do not contact with each other at the trailing edge, and
wherein the pressure-side outer shell and the suction-side outer shell are joined together by a trailing-edge spar which extends in a longitudinal direction of the wind turbine blade between the pressure-side outer shell and the suction-side outer shell at a position nearer to the trailing edge.

11. A wind turbine generator comprising:
the wind turbine blade of claim 1.

12. A method of designing a wind turbine blade which comprises a blade tip part, a blade root part connected to a hub of a wind turbine and an airfoil part disposed between the blade tip part and the blade root part, the method comprising the step of
determining the airfoil part as a flatback airfoil with a blunt trailing edge
at least in an area in a longitudinal direction of the wind turbine blade where a blade thickness ratio X is not less than 40% and not greater than 50%, X indicating a ratio of a maximum thickness $t_{MAX}$ to a chord length $L_C$,
wherein, in the area where the blade thickness ratio X is not less than 40% and not greater than 50%, the flatback airfoil has a trailing edge thickness ratio Y which is not less than 5% and not greater than $Y_H$%, Y indicating a ratio of a trailing edge thickness $t_{TE}$ to the maximum thickness $t_{MAX}$, and
wherein $Y_H$ has a relationship of $Y_H=1.5X-30$ with the blade thickness ratio X.

* * * * *